United States Patent [19]

Fukushima et al.

[11] Patent Number: 5,430,811
[45] Date of Patent: Jul. 4, 1995

[54] METHOD FOR INTERPOLATING MISSING PIXELS AND AN APPARATUS EMPLOYING THE METHOD

[75] Inventors: Tsumoru Fukushima, Katano; Hiroshi Onishi, Hirakata; Haruo Yamashita, Osaka, all of Japan

[73] Assignee: Matsushita Electric Industrial Co., Ltd., Osaka, Japan

[21] Appl. No.: 996,189

[22] Filed: Dec. 23, 1992

[30] Foreign Application Priority Data

Dec. 25, 1991 [JP] Japan ................... 3-343005

[51] Int. Cl.$^6$ .............................................. G06K 9/40
[52] U.S. Cl. ...................................... 382/254; 382/298
[58] Field of Search ............... 382/54, 47, 44, 56, 382/27

[56] References Cited

U.S. PATENT DOCUMENTS

| | | | |
|---|---|---|---|
| 4,910,964 | 3/1990 | Walther | 364/581 |
| 5,054,100 | 10/1991 | Tai | 382/54 |
| 5,161,035 | 11/1992 | Muramatsu | 382/47 |

FOREIGN PATENT DOCUMENTS 343795 2/1991 Japan .................. G09G 5/36

*Primary Examiner*—David K. Moore
*Assistant Examiner*—Phuoc Tran
*Attorney, Agent, or Firm*—Price, Gess & Ubell

[57] ABSTRACT

The present invention discloses a missing pixels interpolating method and an apparatus using the method. The method forms a second image from a first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The method comprises the first process of computing values of the first pseudo-pixels using a first monotonous increasing non-linear function, and the second process of computing values of the second pseudo-pixels using a second monotonous increasing non-linear function. The primary derived functions of the first and second monotonous increasing non-linear functions are upwards convex, the domains of definition of input values thereof are consistent with the respective ranges of mapping values, and only one input value other than the limits in each domain of definition is equal to its mapping value. The only one input value and the mapping value are the central neighborhood values of the domain of definition and the range, respectively.

21 Claims, 28 Drawing Sheets

FIG. 1(a)
FIG. 1(b)

FIG. 2(a)

| 40 | 40 | 40 | 40 |
|----|----|----|----|
| 40 | 40 | 40 | 80 |
| 40 | 40 | 80 | 80 |
| 40 | 80 | 80 | 80 |

Pixels Prior to Expansion

FIG. 2(b)

| 40 | 40 | 40 | 40 | 40 | 40 | 40 |
|----|----|----|----|----|----|----|
| 40 | 40 | 40 | 40 | 40 | 50 | 60 |
| 40 | 40 | 40 | 40 | 40 | 60 | 80 |
| 40 | 40 | 40 | 50 | 60 | 70 | 80 |
| 40 | 40 | 40 | 60 | 80 | 80 | 80 |
| 40 | 50 | 60 | 70 | 80 | 80 | 80 |
| 40 | 60 | 80 | 80 | 80 | 80 | 80 |

Pixels Interpolated with Missing Pixels by the Conventional Method.

Arrangement of Pixels and Pseudo-Pixels

| 40 | 40 | 40 | 40 |
|----|----|----|----|
| 40 | 40 | 40 | 80 |
| 40 | 40 | 80 | 80 |
| 40 | 80 | 80 | 80 |

Pixels Prior to Interpolation

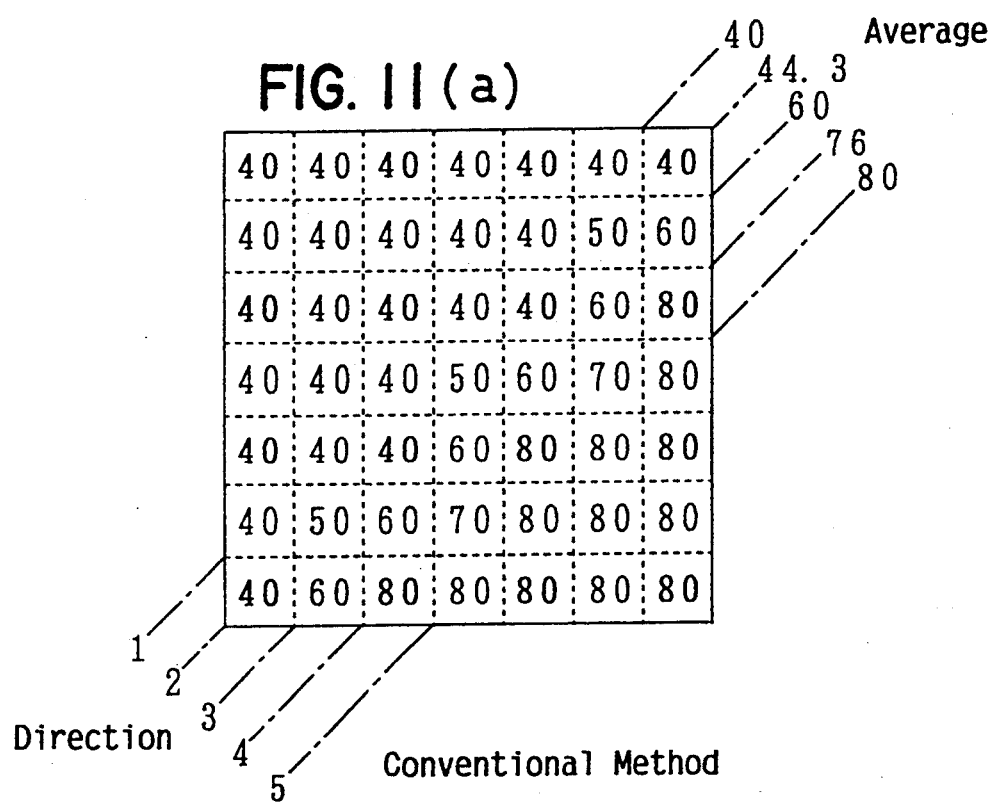
FIG. 11(a) Conventional Method
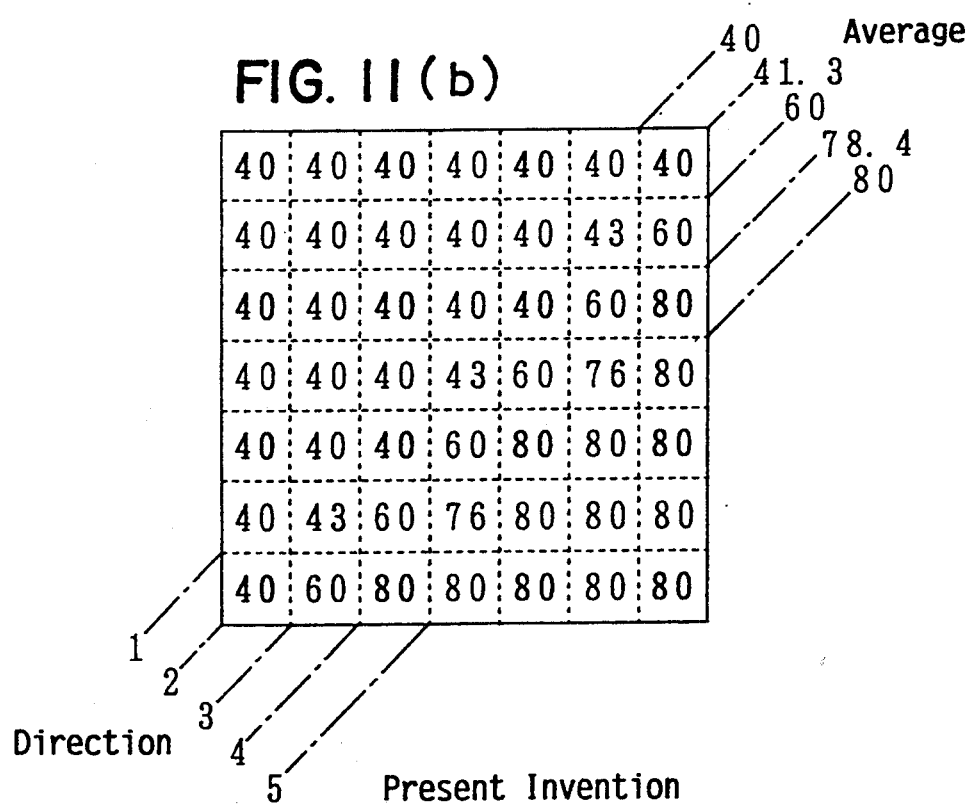
FIG. 11(b) Present Invention

FIG. 13(a)

| 40 | 40 | 40 | 40 | 40 | 40 | 40 |
|----|----|----|----|----|----|----|
| 40 | 40 | 40 | 40 | 40 | 50 | 60 |
| 40 | 40 | 40 | 40 | 40 | 60 | 80 |
| 40 | 40 | 40 | 50 | 60 | 70 | 80 |
| 40 | 40 | 40 | 60 | 80 | 80 | 80 |
| 40 | 50 | 60 | 70 | 80 | 80 | 80 |
| 40 | 60 | 80 | 80 | 80 | 80 | 80 |

Conventional Method

FIG. 13(b)

| 40 | 40 | 40 | 40 | 40 | 40 | 40 |
|----|----|----|----|----|----|----|
| 40 | 40 | 40 | 40 | 40 | 43 | 60 |
| 40 | 40 | 40 | 40 | 40 | 60 | 80 |
| 40 | 40 | 40 | 43 | 60 | 76 | 80 |
| 40 | 40 | 40 | 60 | 80 | 80 | 80 |
| 40 | 43 | 60 | 76 | 80 | 80 | 80 |
| 40 | 60 | 80 | 80 | 80 | 80 | 80 |

Present Invention

Synthesized Function of Linear and Non-linear Functions

The First Function : Non-linear
The Second Function : Linear
(Average of 4 pixel values)

The First Function : Linear
(Average of 4 pixel values)
The Second Function : Non-linear The First Function : Non-linear
(Excluding the Maximum and Minimum Values)
The Second Function : Non-linear
(Excluding the Maximum and Minimum Values)

METHOD FOR INTERPOLATING MISSING PIXELS AND AN APPARATUS EMPLOYING THE METHOD

BACKGROUND OF THE INVENTION (1) Field of the Invention

The present invention relates to a method for interpolating missing pixels when image is expanded, and to an apparatus for a tone-image employing this method, such as a television, a video player, a video recorder, and a printer.

(2) Description of the Related Art

With rapid progress in the field of digital and highly integrated data, there has been an increasing need to improving a method for interpolating missing pixels that makes it possible to use existing data source as fully as possible.

Conventionally, the missing pixels are interpolated by a method using a linear function, by which approximate values of them (pixel data, such as a luminance expressed by its values) are computed by internally dividing those of neighboring pixels. For example, when an image is expanded four times in a specific ratio, the pixels symbolized by ◯ as shown in FIG. 1(a) are interpolated with the missing pixels symbolized by X, ▽ and Δ as shown in FIG. 1(b): as a matter of fact, the values thereof are the average of values of four neighboring pixels; that of two pixels neighboring to the left and right; and that of two pixels neighboring vertically.

However, the above conventional method has been plagued with three following problems:

1) Using the average of values makes differences in value between the pixels and missing pixels interpolated relatively small, therefore a boundary of luminance becomes unclear, making the image blurred and degrading resolution in an expanded image.

2) Although the differences in value, appearing as the diagonal line, looks substantially straight in an image, it is, in fact, a notched line as shown in FIG. 2(a) if seen in a pixel level. These notches are expanded accordingly as shown in FIG. 2(b), causing the diagonal line to appear a notched line in the expanded image.

3) Any noise contained in the pixels is subject to expansion as well, hence expanded inevitably.

Therefore, to devise an improved method for interpolation that overcomes these problems and an exemplary apparatus thereof has a great significance in meeting the need of today's image technology.

SUMMARY OF THE INVENTION

The present invention therefore has an object to provide a method for interpolating missing pixels that makes the notches in the diagonal line as fine as possible, while minimizing the resolution degradation and noise expansion, and an apparatus employing this method.

The above object is fulfilled by a missing pixels interpolating method that forms the second image from the first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The method comprises the first process of computing values of the first pseudo-pixels using the first monotonous increasing non-linear function, and the second process of computing values of the second pseudo-pixels using the second monotonous increasing non-linear function.

The primary derived functions of the first and second monotonous increasing non-linear functions may be upwards convex, the domains of definition of input values thereof may be consistent with the respective ranges of mapping values, and only one input value other than the limits in each domain of definition may be equal to its mapping value.

The only one input value and its mapping value may be the central neighborhood values of the domain of definition and the range, respectively.

The first process may include the first step of computing the maximum value and the minimum value of the pixels neighboring to the first pseudo-pixel diagonally, each of which being referred to as max1 and min1, respectively, the second step of computing the average value of the four pixels by averaging out either the values of the four pixels, or two of them excluding ones having the max1 and the min1, the average value being referred to as ave1, the third step of computing a mapping value for ave1 using a monotonous increasing non-linear function ranging from the min1 to the max1, of which maximum mapping value and the minimum mapping value are consistent with the max1 and the min1, respectively, the mapping value being referred to as D1, and the fourth step of storing the D1 into an image memory as the value of the first pseudo-pixel.

The second process may include the first step of computing the maximum value and the minimum value of two of the pixels and two of the first pseudo-pixels neighboring to the second pseudo-pixel, each of which being referred to as max2 and min2, respectively, the second step of computing the average value of the two pixels and the two first pseudo-pixels by averaging out either the values of the two pixels and two pseudo-pixels, or two of them excluding ones having the max2 and the min2, the average value being referred to as ave2, the third step of computing a mapping value for ave2 using a monotonous increasing non-linear function ranging from the min2 to the max2, of which maximum mapping value and the minimum mapping value are consistent with the max2 and the min2, respectively, the mapping value being referred to as D2, and the fourth step of storing the D2 into an image memory as the value of the second pseudo-pixel.

The first image may consist of a luminance component which constitutes a color image together with two color difference components, and the values of two color difference components for interpolation may be computed by a linear function.

The method may further comprise the third process including the first step of compressing the scale of the pixel array in the first direction, and the second step of compressing the scale of the pixel array in the second direction which is orthogonal to the first direction.

The first step of compressing the scale of the pixel array in the first direction may include three sub-steps for each pixel after compression, namely, the first sub-step for computing a location in the original scale corresponding to the pixel after compression using an equation $Pm = (1/k)m$, wherein k is a compression ratio greater than $\frac{1}{2}$ and less than 1, and m is an address in the first direction in the image prior to compression, the second sub-step for computing addresses of the pixels m0 and m1 neighboring to the pixel in the Pm using an equation m0=int(Pm), wherein decimals are omitted
m1=m0+1,
and the third sub-step for computing a value E of the pixel in the Pm through an internally division using an equation E=(E1-E0)(Pm-m0)+E0, wherein E0 and E1 are the values of the pixels in m0 and m1, respectively.

The second step of compressing the scale of the pixel array in the second direction may include three sub-steps for each pixel after compression, namely, the first sub-step for computing a location in the original scale corresponding to the pixel after compression using an equation Pn=(1/k)n, wherein k is a compression ratio greater than ½ and less than 1, and n is an address in the second direction in the image prior to compression, the second sub-step for computing addresses of the pixels n0 and n1 neighboring to the pixel in the Pn using an equation n0=int(Pn), wherein decimals are omitted
n1=n0+1, and the third sub-step for computing a value G of the pixel in the Pn through an internally division using an equation G=(G1-G0)(Pn-n0)+G0, wherein G0 and G1 are the values of the pixels in n0 and n1, respectively.

The above object is also fulfilled by a missing pixels interpolating method that forms the second image from the first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The method comprising the first process of computing values of the first pseudo-pixels using a monotonous increasing non-linear function, and the second process of computing values of the second pseudo-pixels using a linear function.

The primary derived function of the monotonous increasing non-linear function may be upwards convex, the domain of definition of input values thereof may be consistent with the range of mapping values, and only one input value other than the limits may be equal to its mapping value.

The only one input value and its mapping value may be the central neighborhood values of the domain of definition and the range, respectively.

The first process may include the first step of computing the maximum value and the minimum value of the pixels neighboring to the first pseudo-pixel diagonally, each of which being referred to as max1 and min1, respectively, the second step of computing the average value of the four pixels by averaging out either the values of the four pixels, or two of them excluding ones having the max1 and the min1, the average value being referred to as ave1, and the third step of computing a mapping value for ave1 using a monotonous increasing non-linear function ranging from the min1 to the max1, of which maximum mapping value and the minimum mapping value are consistent with the max1 and the min1, respectively, the mapping value being referred to as D1. The second process may include the first step of computing by averaging out either the values of two neighboring pixels, or the two neighboring pixels and two of the first pseudo-pixels, and the second step of storing the average of values obtained in the first step as the value of the second pseudo-pixel.

The first image may consist of a luminance component which constitutes a color image together with two color difference components, and the values of two color difference components for interpolation may be computed by a linear function.

The method may further comprise the third process including the first step of compressing the scale of the pixel array in the first direction, and the second step of compressing the scale of the pixel array in the second direction which is orthogonal to the first direction.

The first step of compressing the scale of the pixel array in the first direction may include three sub-steps for each pixel after compression, namely, the first sub-step for computing a location in the original scale corresponding to the pixel after compression using an equation Pm=(1/k)m, wherein k is a compression ratio greater than ½ and less than 1, and m is an address in the first direction in the image prior to compression, the second sub-step for computing addresses of the pixels m0 and m1 neighboring to the pixel in the Pm using an equation m0=int(Pm), wherein decimals are omitted
m1=m0+1, and the third sub-step for computing a value E of the pixel in the Pm through an internally division using an equation E=(E1-E0)(Pm-m0)+E0, wherein E0 and E1 are the values of the pixels in m0 and m1, respectively.

The second step of compressing the scale of the pixel array in the second direction may include three sub-steps for each pixel after compression, namely, the first sub-step for computing a location in the original scale corresponding to the pixel after compression using an equation Pn=(1/k)n, wherein k is a compression ratio greater than ½ and less than 1, and n is an address in the second direction in the image prior to compression, the second sub-step for computing addresses of the pixels n0 and n1 neighboring to the pixel in the Pn using an equation n0=int(Pn), wherein decimals are omitted
n1=n0+1, and the third sub-step for computing a value G of the pixel in the Pn through an internally division using an equation G=(G1-G0)(Pn-n0)+G0, wherein G0 and G1 are the values of the pixels in n0 and n1, respectively.

The above object is also fulfilled by an apparatus for interpolating missing pixels that forms the second image from the first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The apparatus comprises an image memory for storing data of the first image and the second image, the first average, maximum and minimum value, determining unit for computing the first average value and the maximum value and the minimum value of the pixels neighboring to the first pseudo-pixel diagonally, and for computing the average value of the four pixels by averaging out either the values of the four pixels, or two of them excluding ones having the maximum value and the minimum value, each of which being referred to as max1, min1 and ave1, the first mapping unit for computing a mapping value for ave1 to be stored in the image memory as the value of the first pseudo-pixel by using the first function F1 which is a monotonous increasing non-linear function ranging from Min1 to Max1, whose minimum value and maximum value in the range and those of the domain of definition are consistent with the Min1 and the Max1, and given by $$D1 = \min1 + \frac{\max1 - \min1}{\text{Max1} - \text{Min1}} \left\{ F1\left(\frac{\text{ave1} - \min1}{\max1 - \min1}(\text{Max1} - \text{Min1}) + \text{Min1}\right) - \text{Min1} \right\},$$

the second average, maximum and minimum values determining unit for computing the second average value and the maximum value and the minimum value of two of the pixels and two of the first pseudo-pixels neighboring to the second pseudo-pixel, and for computing the average value of the four pixels by averaging out either the values of the four pixels, or two of them excluding ones having the maximum value and the minimum value, each of which being referred to as max2, min2 and ave2, and the second mapping unit for computing a mapping value for ave2 to be stored in the image memory as the value of the second pseudo-pixel by using the second function F2 which is a monotonous increasing non-linear function ranging from Min2 to Max2, whose minimum value and maximum value in the range and those of the domain of definition are consistent with the Min2 and the Max2, and given by $$D2 = \min2 + \frac{\max2 - \min2}{\text{Max2} - \text{Min2}} \left\{ F2\left(\frac{\text{ave2} - \min2}{\max2 - \min2}(\text{Max2} - \text{Min2}) + \text{Min2}\right) - \text{Min2} \right\}.$$

The primary derived functions of the first function F1 and the second function F2 may be upwards convex, the domains of definition of input values thereof may be consistent with the respective ranges of mapping values, and only one input value other than the limits in each domain of definition may be equal to its mapping value.

The only one input value and its mapping value may be central neighborhood values of the domain of definition and the range, respectively.

The first mapping unit may include the first function table for storing mapping values for input values of the first function F1 by corresponding the input values to its addresses, and the first determining unit for the value of pixels for finding a corresponding mapping value based on the max1, min1 and ave1 by referring to the first function table.

The second mapping unit may include the second function table for storing mapping values for input values of the second function F2 by corresponding the input values to its addresses, and the second determining unit for the value of pixels for finding a corresponding mapping value based on the max2, min2 and ave2 by referring to the second function table.

The first image may consist of a luminance component which constitutes a color image together with two color difference components, and it computes the values of two color difference components for interpolation using a linear function.

The apparatus may further comprise a compressing unit including the first unit for compressing the scale of the pixel array in the first direction, and the second unit for compressing the scale of the pixel array in the second direction which is orthogonal to the first direction.

The first unit may include three sub-units for each pixel after compression, namely, the first sub-unit for computing a location in the original scale corresponding to the pixel after compression using an equation Pm=(1/k)m, wherein k is a compression ratio greater than ½ and less than 1, and m is an address in the first direction in the image prior to compression, the second sub-unit for computing addresses of the pixels m0 and m1 neighboring to the pixel in the Pm using an equation m0=int(Pm), wherein decimals are omitted
m1=m0+1, and the third sub-unit for computing a value E of the pixel in the Pm through an internally division using an equation E=(E1-E0)(Pm-m0)+E0, wherein E0 and E1 are the values of the pixels in m0 and m1, respectively.

The second unit may include three sub-units for each pixel after compression, namely, the first sub-unit for computing a location in the original scale corresponding to the pixel after compression using an equation Pn=(1/k)n, wherein k is a compression ratio greater than ½ and less than 1, and n is an address in the second direction in the image prior to compression, the second sub-unit for computing addresses of the pixels n0 and n1 neighboring to the pixel in the Pn using an equation n0=int(Pn), wherein decimals are omitted
n1=n0+1, the third sub-unit for computing a value G of the pixel in the Pn through an internally division using an equation G=(G1-G0)(Pn-n0)+G0, wherein G0 and G1 are the values of the pixels in n0 and n1, respectively.

The above object is also fulfilled by an apparatus for interpolating missing pixels that forms the second image from the first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The apparatus comprising an image memory for storing data of the first image and the second image, the first average, maximum and minimum values determining unit for computing the first average value and the maximum value and the minimum value of the pixels neighboring to the first pseudo-pixel diagonally, and for computing the average value of the four pixels by averaging out either the values of the four pixels, or two of them excluding ones having the maximum value and the minimum value, each of which being referred to as max1, min1 and ave1, the first mapping unit for computing a mapping value for ave1 to be stored in the image memory as the value of the first pseudo-pixel by using the first function F1 which is a monotonous increasing non-linear function ranging from Min1 to Max1, whose minimum value and maximum value in the range and those of the domain of definition are consistent with the Min1 and the Max1, and given by $$D1 = \min1 + \frac{\max1 - \min1}{\text{Max}1 - \text{Min}1} \left\{ F1 \left( \frac{\text{ave}1 - \min1}{\max1 - \min1} (\text{Max}1 - \text{Min}1) + \text{Min}1 \right) - \text{Min}1 \right\},$$

and an average determining unit for computing either the average of the values of the four neighboring pixels, or the average of the two neighboring pixels and two of the first pseudo-pixels to store the average value in the image memory as the value of the second pseudo-pixel.

The primary derived functions of the first function F1 and the second function F2 may be upwards convex, the domains of definition of input values thereof may be consistent with the respective ranges of mapping values, and only one input value other than the limits in each domain of definition may be equal to its mapping value.

The only one input value and its mapping value may be the central neighborhood values of the domain of definition and the range, respectively.

The first mapping unit may include the first function table for storing mapping values for input values of the first function F1 by corresponding the input values to its addresses, and the first determining unit for the value of pixels for finding a corresponding mapping value based on the max1, min1 and ave1 by referring to the first function table.

The first image may consist of a luminance component which constitutes a color image together with two color difference components, and it may compute the values of two color difference components for interpolation using a linear function.

The apparatus may further comprise a compressing unit including the first unit for compressing the scale of the pixel array in the first direction, and the second unit for compressing the scale of the pixel array in the second direction which is orthogonal to the first direction.

The first unit may include three sub-units for each pixel after compression, namely, the first sub-unit for computing a location in the original scale corresponding to the pixel after compression using an equation Pm=(1/k)m, wherein k is a compression ratio greater than ½ and less than 1, and m is an address in the first direction in the image prior to compression, the second sub-unit for computing addresses of the pixels m0 and m1 neighboring to the pixel in the Pm using an equation m0=int(Pm), wherein decimals are omitted
m1=m0+1, and the third sub-unit for computing a value E of the pixel in the Pm through an internally division using an equation E=(E1-E0)(Pm-m0)+E0, wherein E0 and E1 are the values of the pixels in m0 and m1, respectively.

The second unit may include three sub-units for each pixel after compression, namely the first sub-unit for computing a location in the original scale corresponding to the pixel after compression using an equation Pn=(1/k)n, wherein k is a compression ratio greater than ½ and less than 1, and n is an address in the second direction in the image prior to compression, the second sub-unit for computing addresses of the pixels n0 and n1 neighboring to the pixel in the Pn using an equation n0=int(Pn), wherein decimals are omitted
n1=n0+1, and the third sub-unit for computing a value G of the pixel in the Pn through an internally division using an equation G=(G1-G0)(Pn-n0)+G0, wherein G0 and G1 are the values of the pixels in n0 and n1, respectively.

According to the present invention that uses the non-linear function to compute the value of the first pseudo-pixel, the notches in the diagonal line can be maintained as fine as possible, thus minimizing resolution degradation as well as suppressing noise expansion in the expanded image. The values of the second pseudo-pixels may be the average of the values of the two neighboring pixels, or computed by another or the same non-linear function used for the first pseudo-pixel.

The present invention is effective, in particular, in producing an expanded full-color image. Computing the values related to the luminance component of the pseudo-pixels, and using the average of values of the two neighboring pixels for the values related to the color difference components make the expanded image free from color and hue degradation.

Moreover, the image can be expanded by any arbitrary multiplication factor through expansion of the image followed by compression while maintaining excellent resolution.

In addition, according to the present invention, a processing speed can be increased when, in the method, the value of the first pseudo-pixel is computed by the first step of computing the maximum value and the minimum value of the pixels neighboring to the first pseudo-pixel diagonally, each of which being referred to as max1 and min1, respectively, the second step of computing the average value of the four pixels by averaging out either the values of the four pixels, or two of them excluding ones having the max1 and the min1, the average value being referred to as ave1, the third step for detecting a correlation by subtracting the min1 from the max1 and comparing the balance thereof with a certain value, and detecting a correlation when the balance is smaller than the certain value, and the fourth step for selecting the ave1 when there is no correlation, or a value obtained by a monotonous increasing non-linear function when there is a correlation as the value of the first pseudo-pixel.

The primary derived function of the monotonous increasing non-linear functions used in the fourth step may be upwards convex, the domain of definition of input values thereof may be consistent with the range of mapping values, and only one input value other than the limits may be equal to its mapping value.

The only one input value and its mapping value may be the central neighborhood values of the domain of definition and the range, respectively.

The value of the second pseudo-pixel may be computed by the first step of computing the maximum value and the minimum value of two of the pixels and two of the first pseudo-pixels neighboring to the second pseudo-pixel, each of which being referred to as max2 and min2, respectively, the second step of computing the average value of the two pixels and the two first pseudo-pixels by averaging out either the values of the two pixels and two pseudo-pixels, or two of them excluding ones having the max2 and the min2, the average value being referred to as ave2, the third step for detecting a correlation by subtracting the min2 from the max2 and comparing the balance thereof with a certain value, and detecting a correlation when the balance is smaller than the certain value, and the fourth step for selecting the ave2 when there is no correlation, and a value obtained by a monotonous increasing non-linear function when there is a correlation as the value of the second pseudo-pixel.

The primary derived function of the monotonous increasing non-linear function used in the fourth step for the second pseudo-pixel may be upwards convex, the domain of definition of input values thereof may be consistent with the range of mapping values, and only one input value other than the limits may be equal to its mapping value.

The only one input value and its mapping value may be the central neighborhood values of the domain of definition and the range, respectively.

The first image may consist of a luminance component which constitutes a color image together with two color difference components, and the values of two color difference components for interpolation may be computed by a linear function.

The method may further comprise the third process including the first step of compressing the scale of the pixel array in the first direction, and the second step of compressing the scale of the pixel array in the second direction which is orthogonal to the first direction.

The first step of compressing the scale of the pixel array in the first direction may include three sub-steps for each pixel after compression, namely the first sub-step for computing a location in the original scale corresponding to the pixel after compression using an equation $Pm=(1/k)m$, wherein k is a compression ratio greater than ½ and less than 1, and m is an address in the second direction in the image prior to compression, the second sub-step for computing addresses of the pixels m0 and m1 neighboring to the pixel in the Pm using an equation $m0=int(Pm)$, wherein decimals are omitted
$m1=m0+1$, and the third sub-step for computing a value E of the pixel in the Pm through an internally division using an equation $E=(E1-E0)(Pm-m0)+E0$, wherein E0 and E1 are the values of the pixels in m0 and m1, respectively.

The second step of compressing the scale of the pixel array in the second direction may include three sub-steps for each pixel after compression, namely the first sub-step for computing a location in the original scale corresponding to the pixel after compression using an equation $Pn=(1/k)n$, wherein k is a compression ratio greater than ½ and less than 1, and n is an address in the first direction in the image prior to compression, the second sub-step for computing addresses of the pixels n0 and n1 neighboring to the pixel in the Pn using an equation $n0=int(Pn)$, wherein decimals are omitted
$n1=n0+1$, and the third sub-step for computing a value G of the pixel in the Pn through an internally division using an equation $G=(G1-G0)(Pn-n0)+G0$, wherein G0 and G1 are the values of the pixels in n0 and n1, respectively.

The processing speed can be also increased by an apparatus for interpolating missing pixels that forms the second image from the first image by interpolating a plurality of pixels constituting the first image with a plurality of first pseudo-pixels in such a way that they neighbor to the pixels diagonally and with a plurality of second pseudo-pixels in such a way that they neighbor to the pixels vertically and horizontally. The apparatus comprises an image memory for storing data of the first image and the second image, the first average, maximum and minimum values determining unit for computing the first average value and the maximum value and the minimum value of the pixels neighboring to the first pseudo-pixel diagonally, and for computing the average value of the four pixels by averaging out either the values of the four pixels, or two of them excluding ones having the maximum value and the minimum value, each of which being referred to as max1, min1 and ave1, the first correlation detecting unit for detecting a correlation by subtracting the min1 form the max1 and comparing the balance thereof with a certain value, and detecting a correlation when the balance is smaller than the certain value, and the first selecting unit for selecting the ave1 when there is no correlation, and a value obtained by a monotonous increasing non-linear function when there is a correlation as the value of the first pseudo-pixel.

The primary derived function of the monotonous increasing non-linear function used in the first selecting unit may be upwards convex, the domain of definition of input values thereof may be consistent with the range of mapping values, and only one input value other than the limits may be equal to its mapping value.

The only one input value and its mapping value may be the central neighborhood values of the domain of definition and the range, respectively.

The apparatus may further comprise the second average, maximum and minimum values determining unit for computing the second average value and the maximum value and the minimum value of two of the pixels and two of the first pseudo-pixels neighboring to the second pseudo-pixel, and for computing the average value of the four pixels by averaging out either the values of the four pixels, and two of them excluding ones having the maximum value and the minimum value, each of which being referred to as max2, min2 and ave2, $$D2 = min2 + \frac{max2 - min2}{Max2 - Min2} \left\{ F2 \left( \frac{ave2 - min2}{max2 - min2} (Max2 - Min2) + Min2 \right) - Min2 \right\},$$

the second correlation detecting unit for detecting a correlation by subtracting the min2 form the max2 and comparing the balance thereof with a certain value, and detecting a correlation when the balance is smaller than the certain value, and the second selecting unit for selecting the ave2 when there is no correlation, and a value obtained by a monotonous increasing non-linear function when there is a correlation as the value of the second pseudo-pixel.

The primary derived function of the monotonous increasing non-linear function used in the second selecting unit for the second pseudo-pixel may be upwards convex, the domain of definition of input values thereof may be consistent with the range of mapping values, and only one input value other than the limits may be equal to its mapping value.

The only one input value and its mapping value may be the central neighborhood values of the domain of definition and the range, respectively.

The first image may consist of a luminance component which constitutes a color image together with two color difference components, and it may compute the values of two color difference components for interpolation by a linear function.

The apparatus may further comprise the first compressing unit for compressing lengthwise the pixel array in the first direction in an expanded image, and the second compressing unit for compressing widthwise the pixel array in the first direction which is orthogonal to the first direction in the expanded image.

The first unit may include three sub-units for each pixel after compression, namely, the first sub-unit for computing a location in the original scale corresponding to the pixel after compression using an equation Pm=(1/k)m, wherein k is a compression ratio greater than ½ and less than 1, and m is an address in the first direction in the image prior to compression, the second sub-unit for computing addresses of the pixels m0 and m1 neighboring to the pixel in the Pm using an equation m0=int(Pm), wherein decimals are omitted
m1=m0+1, and the third sub-unit for computing a value E of the pixel in the Pm through an internally division using an equation E=(E1-E0)(Pm-m0)+E0, wherein E0 and E1 are the values of the pixels in m0 and m1, respectively.

The second unit includes three sub-units for each pixel after compression, namely, the first sub-unit for computing a location in the original scale corresponding to the pixel after compression using an equation Pn=(1/k)n, wherein k is a compression ratio greater than ½ and less than 1, and n is an address in the second direction in the image prior to compression, the second sub-unit for computing addresses of the pixels n0 and n1 neighboring to the pixel in the Pn using an equation n0=int(Pn), wherein decimals are omitted
n1=n0+1, and the third sub-unit for computing a value G of the pixel in the Pn through an internally division using an equation G=(G1-G0)(Pn-n0)+G0, wherein G0 and G1 are the values of the pixels in n0 and n1, respectively.

When the values of the pseudo-pixels are computed by selectively using the mapping value of the non-linear function, and the average of values of the concerned pixels and/or pseudo-pixels, the processing speed can be increased without degrading resolution.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 1(a) is a view of pixels prior to expansion;

FIG. 1(b) is a view of pixels interpolated with missing pixels;

FIG. 2(a) is a diagonal line appears in an image prior to expansion;

FIG. 2(b) is a diagonal line appears in an expanded image by the conventional method;

FIG. 10 is a view of the pixels in the expanded image prior to interpolation;

FIG. 11(a) is a view of the pixels interpolated with the pseudo-pixels by the conventional method;

FIG. 11(b) is a view of the pixels interpolated with the pseudo-pixels by the method of the present invention;

FIG. 13(a) is view of the diagonal line appears in FIG. 11(a);

FIG. 13(b) is a view of the diagonal line appears in FIG. 11(b);

DESCRIPTION OF THE PREFERRED EMBODIMENTS

First Embodiment

The apparatus for interpolating missing pixels in accordance with the first embodiment is designed so that it expands a monochrome image four times in a specific ratio, thus, only values related to luminance are subject to computation.

Hereinafter, the pixels in an image prior to expansion are referred to as pixels a, the missing pixels neighboring to four pixels a as the first pseudo-pixels b, ones neighboring to two pixels a in the right and left as the second pseudo-pixels c1, and ones neighboring to two pixels a vertically as the second pseudo-pixels c2. Likewise, the image prior to expansion consisting of the pixels a is referred to as the first image and the expanded image consisting of the pixels a and the first and second pseudo-pixels b, c1 and c2 as the second image.

Figure 3:
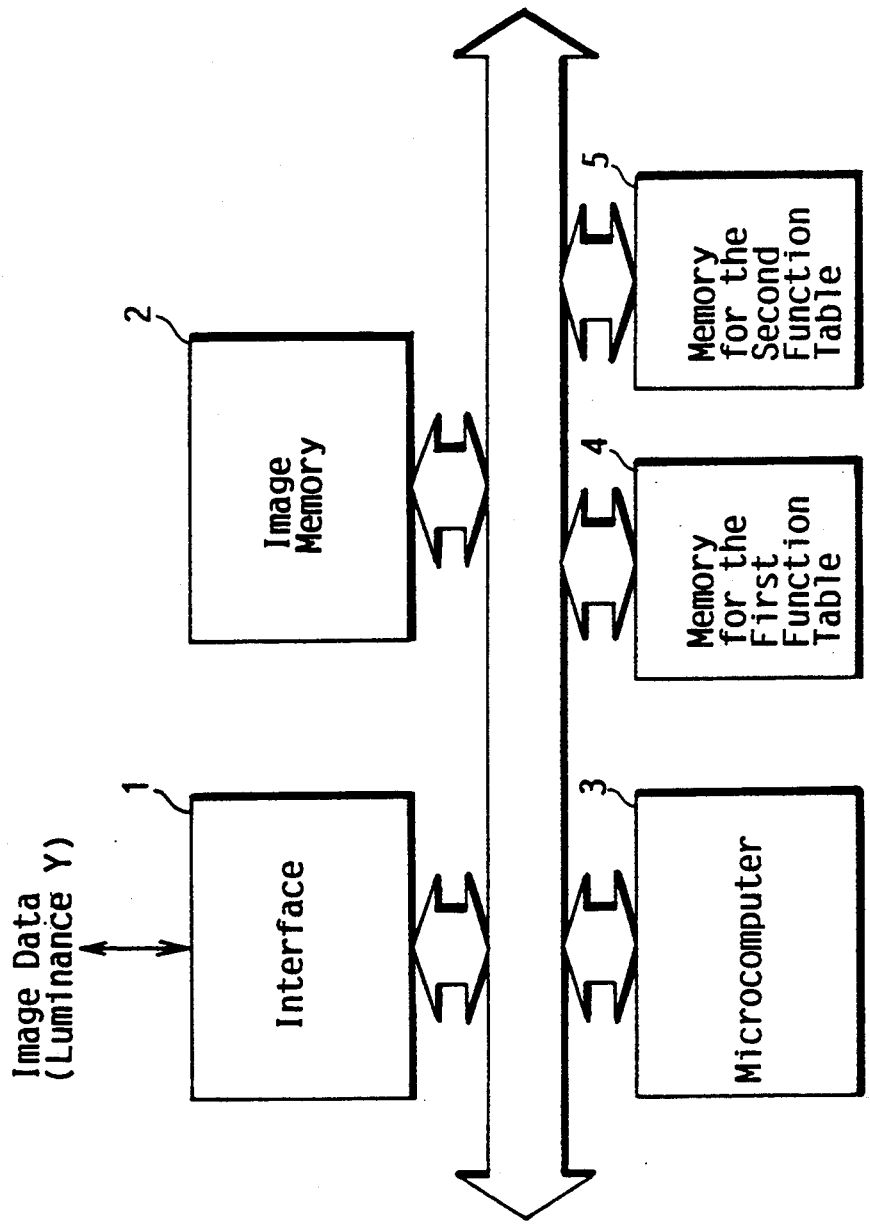
FIG. 3 is a block diagram of the apparatus for interpolating pseudo-pixels in the first embodiment.

As is shown in FIG. 3, the apparatus is composed of an interface 1, an image memory 2, a microcomputer 3, a memory 4 for the first function table, and another memory 5 for the second function table.

The interface 1 converts the first image data inputted thereto into an 8-bit digital signal.

Figure 4:
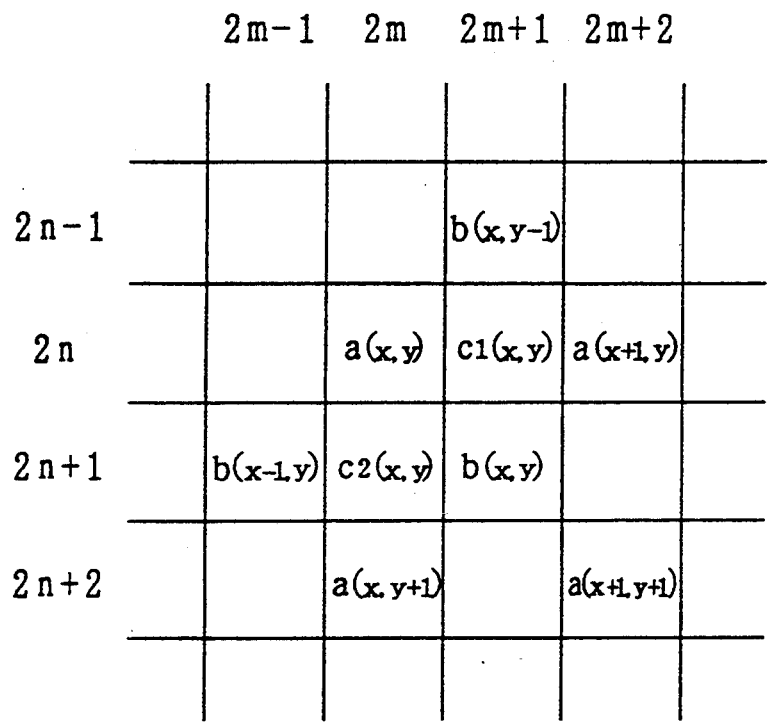
FIG. 4 is a view depicting the arrangement of the pixels a, the first pseudo-pixels b and the second pseudo-pixels c1 and c2.

The image memory 2 stores the first image data, and the second image data (in fact, mapping values of non-linear functions which will be described later) in accordance with an arrangement shown in FIG. 4. Each pixel's location expressed by a coordinate (x, y) corresponds to an address in the image memory 2, of which column is expressed by m and row by n.

The microcomputer 3 includes a CPU (Central Processing Unit), a ROM (Read-Only Memory), a RAM (Random Access Memory) and input/output units.

The memory 4 stores the first function table, while the memory 5 does the second function table.

The apparatus constructed as above is controlled by the microcomputer 3, and the method of interpolation thereof comprises the four following steps:

1) The first average, maximum and minimum values computing step.
2) The first mapping value computing step.
3) The second average, maximum and minimum values computing step.
4) The second mapping value computing step.

Figure 5:
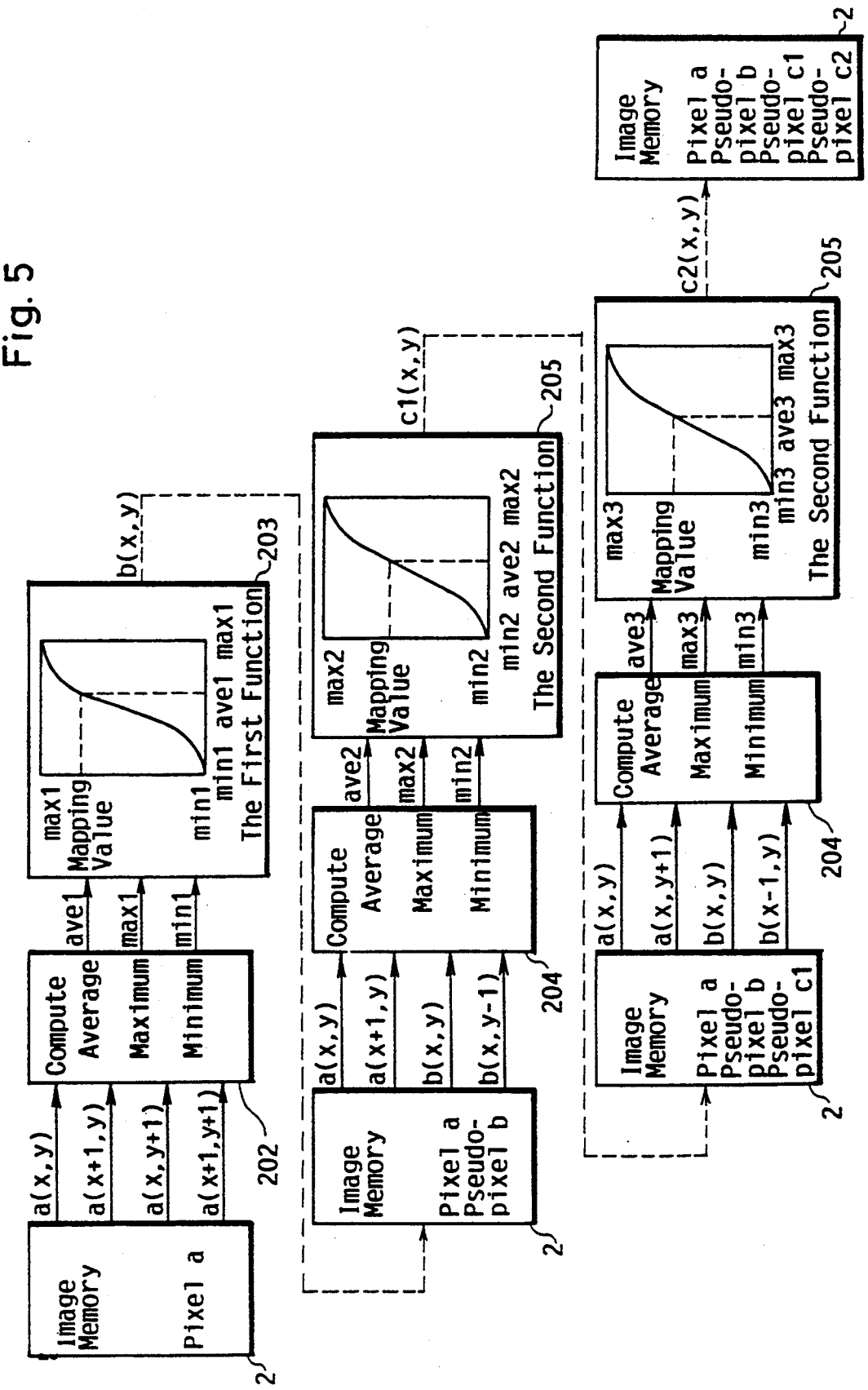
FIG. 5 is a flow diagram of the method of interpolation.

These four steps are explained in detail by referring to the flow diagram in FIG. 5.

In Step 202, the microcomputer 3 computes the average, maximum and minimum of the values of four pixels a(x,y), a(x+1, y), a(x, y+1) and a(x+1, y+1) neighboring to the first pseudo-pixels b1, each of which is referred to as ave1, max1 and min1, respectively. It may compute the ave1 by averaging out the values of two of them excluding ones having the max1 and min1.

In Step 203, it computes a mapping value D1 for the ave1 using the equation [1] below. The equation [1] is a monotonous increasing non-linear function ranging from min1 to max1; the maximum and minimum mapping values are consistent with the max1 and min1; and ave1 is normalized to the range of the min1 to the max1, F1 is to that of Min1 to Max1, and the mapping value D1 to that of the min1 to the max1. Then, it writes the mapping value D1 into a predetermined address in the image memory 2 as the value of the first pseudo-pixel b(x, y).

$$D1 = \text{min1} + \frac{\text{max1} - \text{min1}}{\text{Max1} - \text{Min1}} \left\{ F1 \left( \frac{\text{ave1} - \text{min1}}{\text{max1} - \text{min1}} (\text{Max1} - \text{Min1}) + \text{Min1} \right) - \text{Min1} \right\} \quad [1]$$

In Step 204, the microcomputer 3 computes the average, maximum and minimum of the values of two of the pixels a(x,y) and a(x+1, y) and two of the first pseudo-pixels b(x,y) and b(x, y−1) neighboring to the second pseudo-pixels c1, each of which is referred to as ave2, max2 and min2. Then, it computes the average, maximum and minimum of the values of two of the pixels a(x,y) and a(x, y+1) and two of the first pseudo-pixels b(x,y) and b(x−1, y) neighboring to the second pseudo-pixel c2, each of which is referred to as ave3, max3 and min3. It may compute the ave2 and ave3 by averaging out the values of two of the concerned pixels a and/or the first pseudo-pixels b excluding the ones having the max2/max3 and min2/min3.

In Step 205, it computes a mapping value D2 for the ave2 using the equation [2] below. The equation [2] is a monotonous increasing non-linear function ranging from the min2 to the max2; the maximum and minimum mapping values are consistent with the max2 and min2; and ave2 is normalized to the range of the min2 to the max2, F2 is to that of Min2 to Max2, and the mapping value D2 to that of the min2 to the max2. Then, it writes the mapping value D2 into a predetermined address in the image memory 2 as the value of the first pseudo-pixel c1(x, y). Also it computes a mapping value D3 for the ave3 using the equation [3] below. The equation [3] is a monotonous increasing non-linear function ranging from the min3 to the max3; the maximum and minimum mapping values are consistent with the max3 and min3; and ave3 is normalized to the range of the min3 to the max3, F2 is to that of Min2 to Max2, and the mapping value D3 to that of the min3 to the max3. Then, it writes the mapping value D3 into a predetermined address in the image memory 2 as the value of the first pseudo-pixel c2(x, y).

$$D2 = \text{min2} + \frac{\text{max2} - \text{min2}}{\text{Max2} - \text{Min2}} \left\{ F2 \left( \frac{\text{ave2} - \text{min2}}{\text{max2} - \text{min2}} (\text{Max2} - \text{Min2}) + \text{Min2} \right) - \text{Min2} \right\} \quad [2]$$

$$D3 = \text{min3} + \frac{\text{max3} - \text{min3}}{\text{Max2} - \text{Min2}} \left\{ F2 \left( \frac{\text{ave3} - \text{min3}}{\text{max3} - \text{min3}} (\text{Max2} - \text{Min2}) + \text{Min2} \right) - \text{Min2} \right\} \quad [3]$$

More precisely, the method of interpolation is described by referring to the flowcharts in FIG. 6 to FIG. 9(b).

Figure 6:
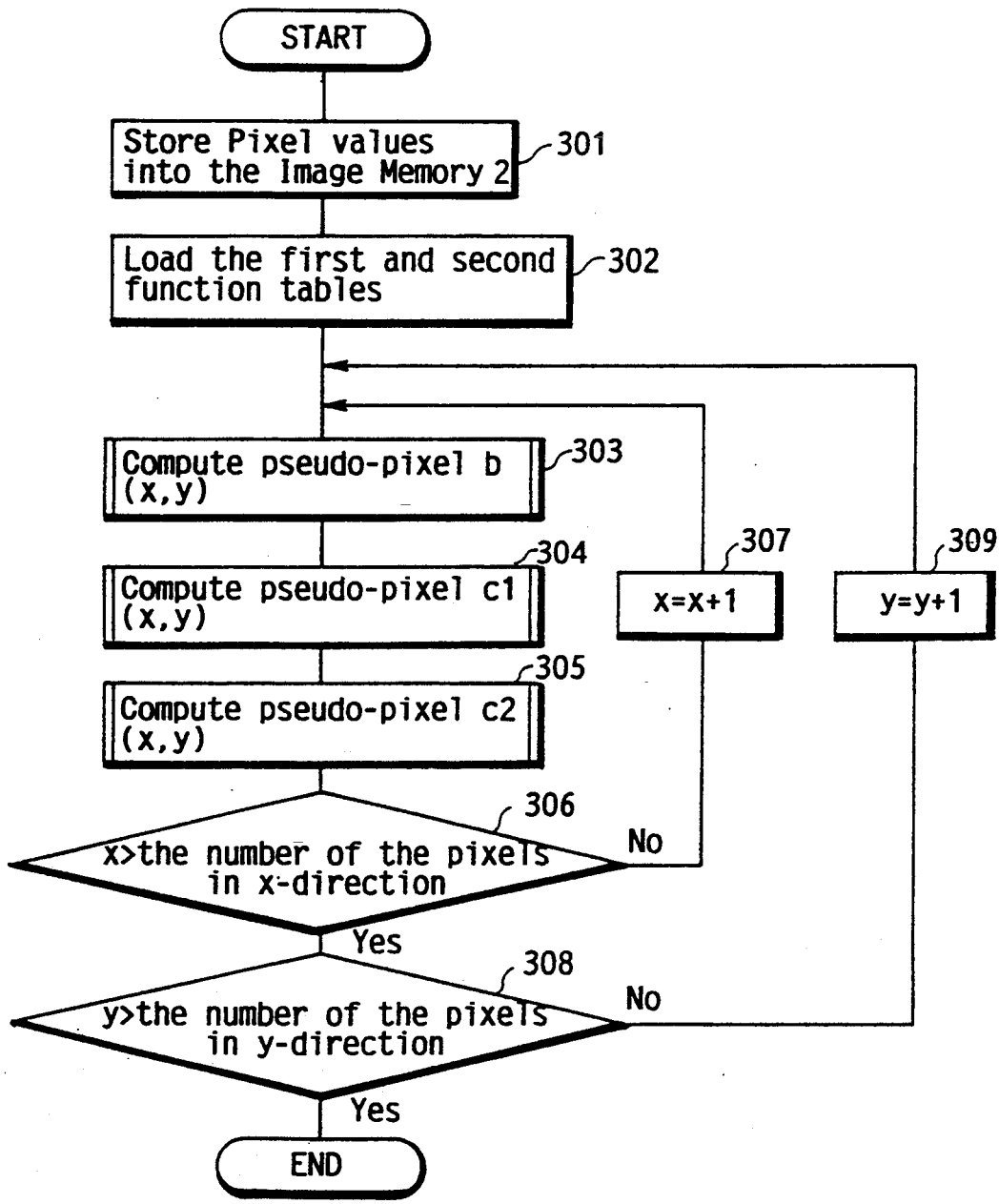
FIG. 6 is a main flowchart of the method of interpolation.

In Step 301 in FIG. 6, the microcomputer 3 writes the first image data converted into an 8-bit digital signal into predetermined cells in the image memory 2, whose addresses in column and row are even numbers, thereby setting the initial coordinate (x, y).

Figure 7A:
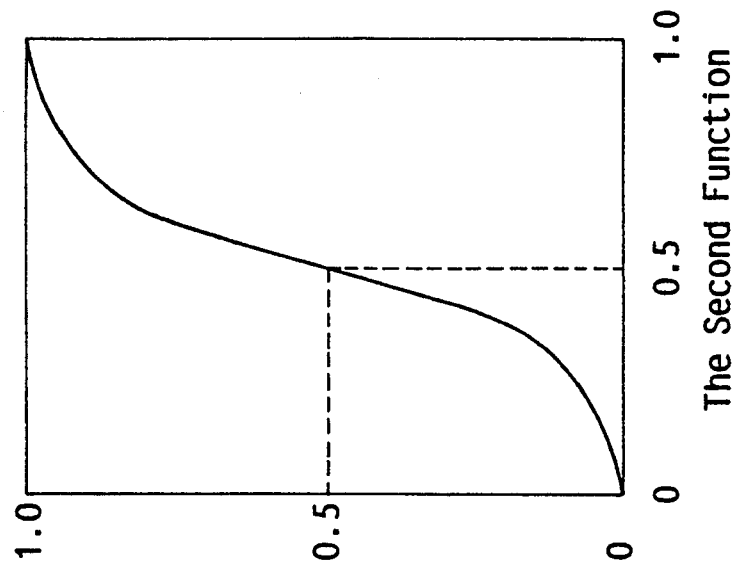
FIG. 7 is a graph showing input/output characteristics of the first and second functions used in the first and second embodiments.
Figure 7B:
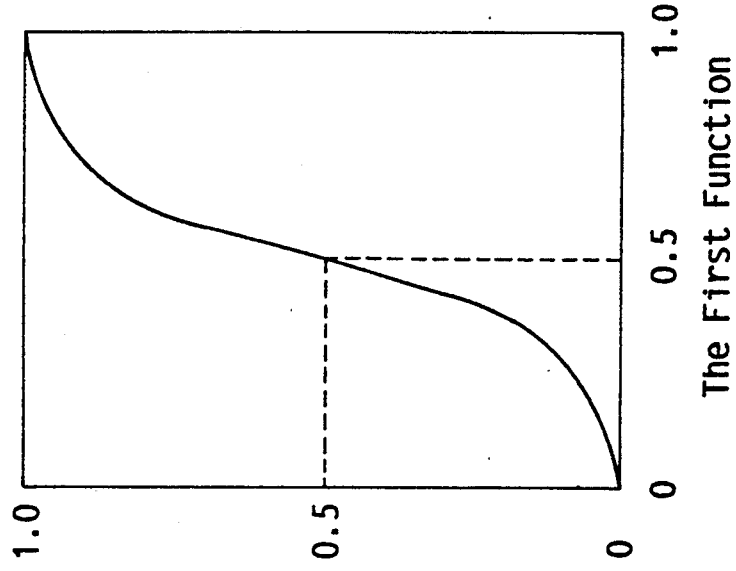

In Step 302, it loads the first and second function tables with mapping values for all input values using the first and second functions shown in FIG. 7. Both the first and second functions are monotonous increase non-linear functions, of which primary derived functions are upwards convex, and the maximum, minimum and the central input values are consistent with those of the mapping values, that is, 1.0, 0 and 0.5, respectively. Thanks to these tables, it can find the right mapping value from them using the input value as an address instead of computing the equations [1] to [3].

Figure 8:
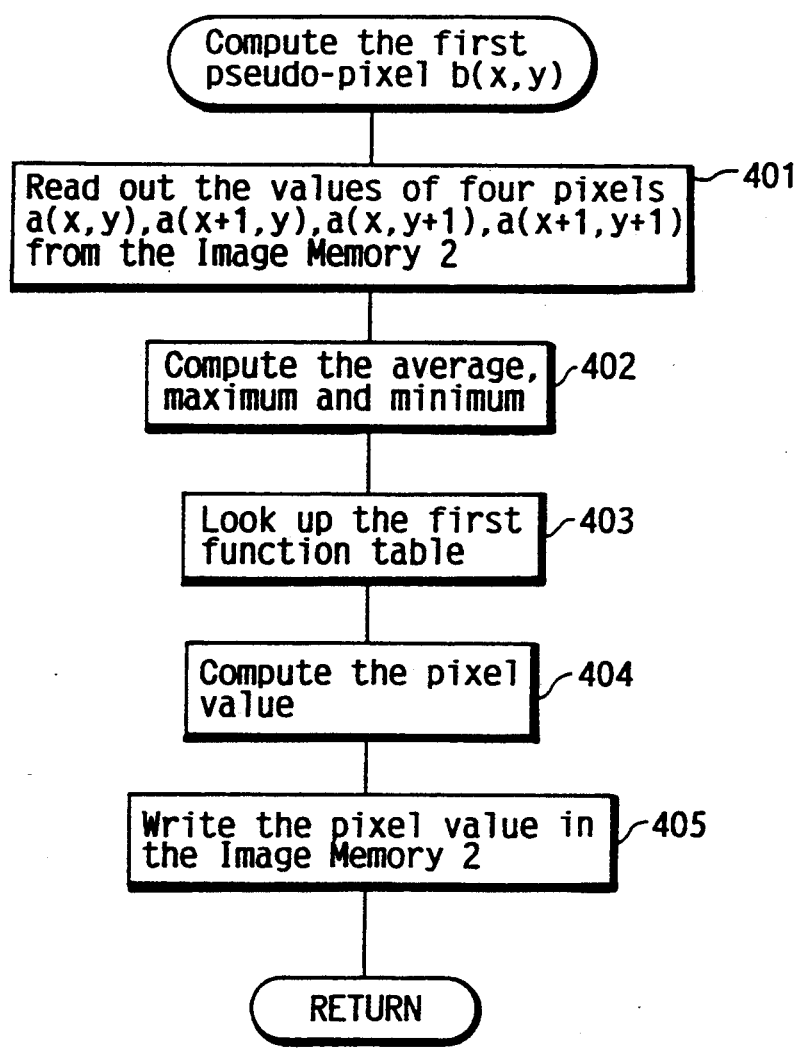
FIG. 8 is a flowchart of the process to compute the values of the first pseudo-pixels b in the first embodiment.
Figure 9:
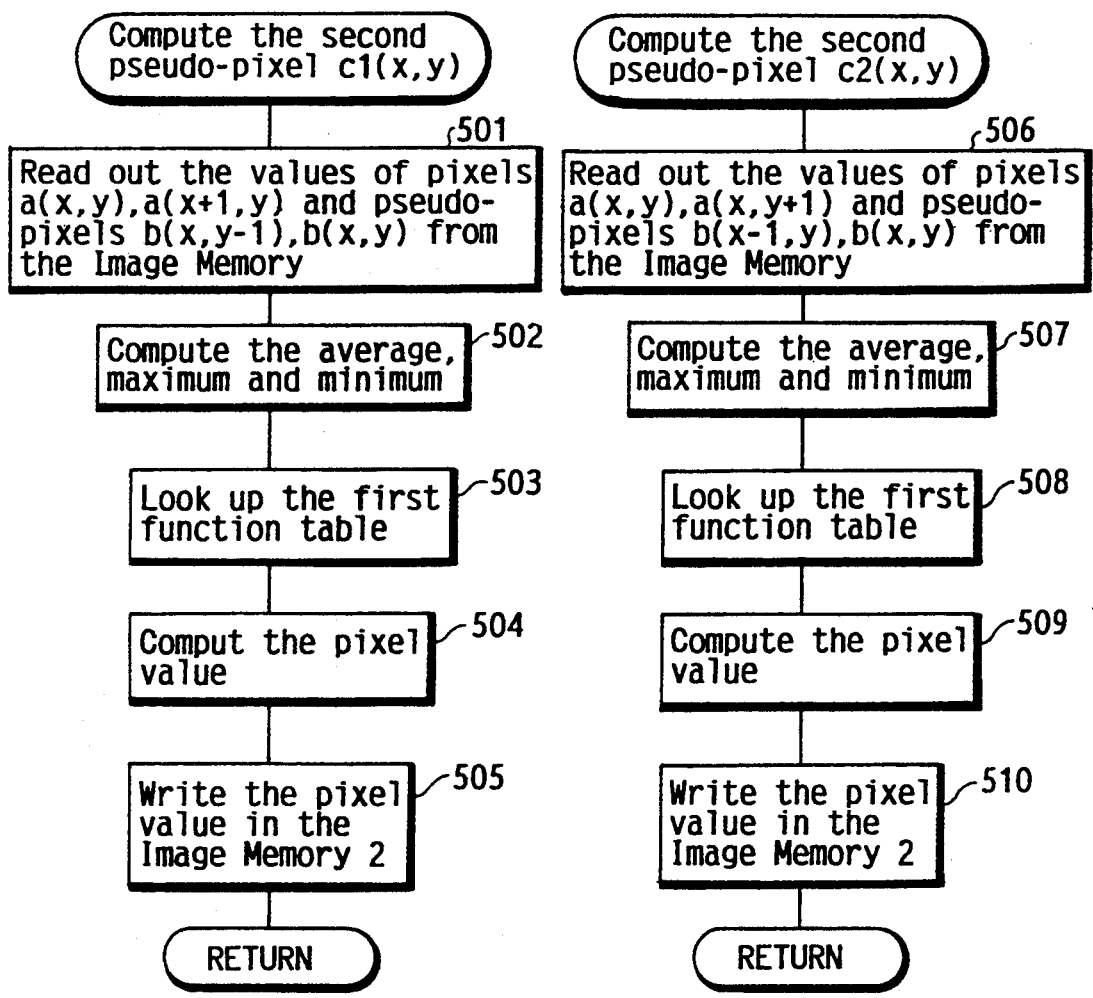
FIG. 9(a) is a flowchart of the process to compute the values of the second pseudo-pixels c1.
FIG. 9(b) is a flowchart of the process to compute the values of the second pseudo-pixels c2.

In Step 303, it computes the value of the first pseudo-pixel b(x,y), which is explained in detail by referring to the flowchart in FIG. 8.

In Step 401, it reads out the values of the four pixels a(x,y), a(x+1, y), a(x, y+1), and a(x+1, y+1) from the image memory 2.

In Step 402, it computes the ave1, max1 and min1.

In Step 403, it computes an address ad1 in the first function table for ave1 using the equation [4] below, by which the ad1 is normalized to the range of the table—from admin1 to admax1. Then, it looks up the first function table to find a value e1 for the ad1.

$$ad1 = \frac{ave1 - min1}{max1 - min1}(admax1 - admin1) + admin1 \qquad [4]$$

In Step 404, it converts the value e1 into the mapping value D1 of actual scale using the equation [5].

$$D1 = min1 + \frac{max1 - min1}{Max1 - Min1} e1 \qquad [5]$$

In Step 405, it writes the mapping value D1 as the value of the first pseudo-pixel b(x, y) into a predetermined address in the image memory 2.

Following the computation of the value of the first pseudo-pixel b(x,y), it computes the second pseudo-pixel c1(x,y) in Step 304 in FIG. 6, which is explained in detail by referring to a flowchart in FIG. 9(a).

In Step 501, the microcomputer 3 reads out the values of two of the pixels a(x,y) and a(x+1, y) and the first pseudo-pixels b(x,y−1) and b(x,y) from the image memory 2.

In Step 502, it computes the ave2, max2 and min2.

In Step 503, it computes an address ad2 in the second function table for ave2 using the equation [6] below, by which the ad2 is normalized to the range of the table, from admin2 to admax2. Then, it looks up the first function table to find a value e2 for the ad2.

$$ad2 = \frac{ave2 - min2}{max2 - min2}(admax2 - admin2) + admin2 \qquad [6]$$

In Step 504, it converts the value e2 into the mapping value D2 of the actual scale using the equation [7].

$$D2 = min2 + \frac{max2 - min2}{Max2 - Min2} e2 \qquad [7]$$

In Step 505, it writes the mapping value D2 as the value of the second pseudo-pixel c1(x, y) into a predetermined address in the image memory 2.

Following the computation of the second pseudo-pixel c1(x,y), it computes the second pseudo-pixel c2(x,y) in Step 305 in FIG. 6, which is explained in detail by referring to the flowchart in FIG. 9(b).

In Step 506, it reads out the value of two of the pixels a(x,y) and a(x, y+1) and two of the first pseudo-pixels b(x−1,y) and b(x,y) from the image memory 2.

In Step 507, it computes the ave3, max3 and min3.

In Step 508, it computes an address ad3 in the second function table for ave3 using the equation [8] below, by which the ad3 is normalized to the range of the table—from admin3 to admax3. Then, it looks up the first function table to find a value e3 for the ad3.

$$ad3 = \frac{ave3 - min3}{max3 - min3}(admax2 - admin2) + admin2 \qquad [8]$$

In Step 509, it converts the value e3 into the mapping value D3 of actual scale using the equation [9].

$$D3 = min3 + \frac{max3 - min3}{Max2 - Min2} e3 \qquad [9]$$

In Step 510, it writes the mapping value D3 as the value of the second pseudo-pixel c2(x, y) into a predetermined address in the image memory 2.

In Step 306 in FIG. 6, it checks whether all the pseudo-pixels in the x-direction are interpolated by comparing the number of the pixels in the x-direction with that of the current x. If the former is greater than the latter, it jumps to Step 308; otherwise, it goes to Step 307.

In Step 307, it adds a value 1 to the number of the current x and returns to Step 303.

In Step 308, it checks whether all the pseudo-pixels in the y-direction are interpolated by comparing the number of the pixels in the y-direction with that of the current y. If the former is greater than the latter, it terminates the operation; otherwise, it goes to Step 309.

In Step 309, it adds a value 1 to the number of the current y and returns to Step 303.

Strictly speaking, to compute the values of the second pseudo-pixels c1(0,0) and c2(0,0) neighboring to the end pixel a(0,0), those of the first pseudo-pixels b(0,−1) and b(−1,0) are necessary in the above method. However, as the values of such first pseudo-pixels b are not stored in the image memory 2 in fact, the microcomputer 3 averages out the values of the two pixels a(0,0) and a(1,0), and those of the two pixels a(0,0) and a(0,1) to use the results for the respective computations.

To visualize the effects of the present invention, a monochrome image in 480×640 dots as an example was expanded four times in a specific ratio by the conventional method and the method of the present invention. In the method of the present invention, the equation [10] below was used as the first and second functions. The pixels in the expanded image and prior to interpolation is shown in FIG. 10 (hereinafter, figures in bold refer to the pixels a), and the results of interpolation by these two methods are shown in FIGS. 11(a) and 11(b), respectively.

$$F(x) = \frac{\frac{1}{1 + \exp(2 - 4x)} - b}{a} + c(x - 0.5) \qquad [10]$$

wherein a, b and c are constants; in the example, 0.98, 0.01 and 0.22, were used, respectively.

Figure 12:
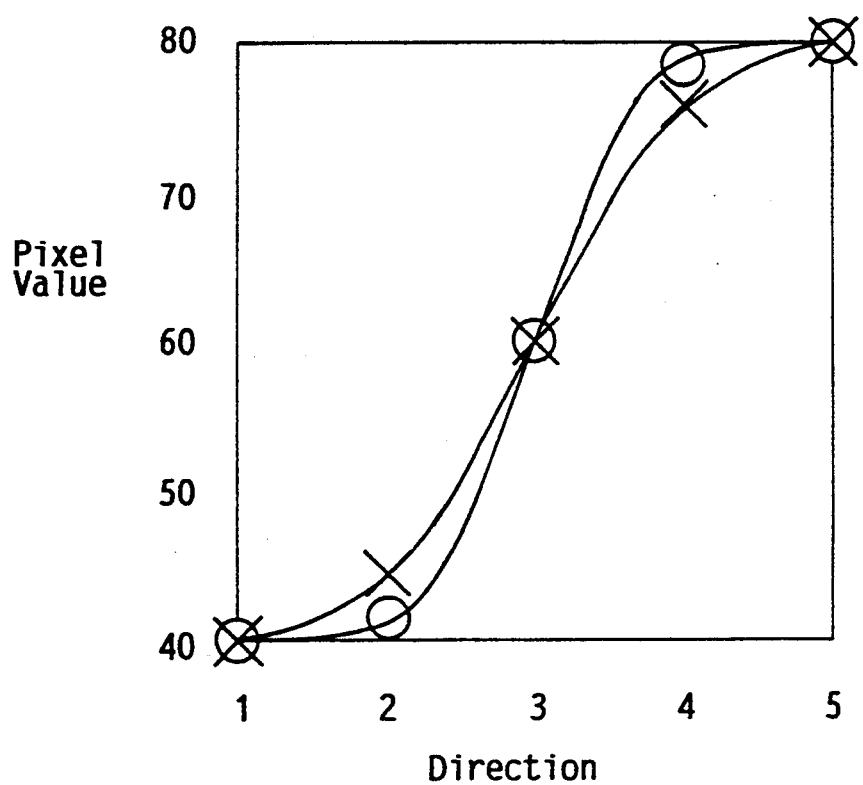
FIG. 12 is a view showing the characteristics of diagonal lines in FIGS. 11(a) and (b)

In addition, the averages of values related to luminance in five diagonal directions 1 to 5 (the diagonal direction 3 was the diagonal line) were studied and shown in the graph in FIG. 12, wherein the average obtained by the conventional method is symbolized by X and that by the present invention by ◯. The averages of the latter form a relatively steep curve compared with that of the former, which means the diagonal line appears more distinctly in the latter, hence upgrading resolution than in the former.

FIGS. 13(a) and (b) illustrate how the diagonal lines in FIGS. 11(a) and (b) look in the pixel level. In FIG. 13(a), the notches of the diagonal line became rough due to uneven difference in value, making the second image blurred, and thus, degrading resolution. Whereas in FIG. 13(b), the notches remained fine and straight because the difference in value was maintained around 20, making the diagonal line more distinct, and thus upgrading resolution compared with the conventional method.

Moreover, it was acknowledged that the present invention resolved the noise expansion problem as well.

It is known that when one of the four pixels a neighboring to the first pseudo-pixels b contains noise, the value thereof differs considerably from those of the other three pixels, and it is, in general, either the maximum or minimum value.

Under these conditions, the conventional method approximates the value of the pseudo-pixels by averaging out the values of the concerned pixels whether they contain noise or not, therefore, noise is expanded substantially equally in the second image. Whereas in the present invention using the non-linear functions, the mapping values used as the values of the pseudo-pixels vary in proportion to the average of values of the concerned pixels and/or pseudo-pixels: when the average is close to the minimum/maximum of the domain of definition, its mapping value is far closer the minimum/maximum of the range compared with the conventional method. For this reason, even when one of the concerned pixels has either a notably larger or smaller value due to noise, such a difference in value is offset in the mapping value, making it possible to suppress the noise expansion.

It was also acknowledged that when the microcomputer 3 did not normalize respective values in the equations 4 to 9 using the maximum and minimum values of the concerned pixels and pseudo-pixels, neither effect of maintaining excellent resolution nor suppressing noise expansion was witnessed in the second image.

When the first pseudo-pixels b were computed by the equation [10] and the average of values of the two neighboring pixels a was used as the value of the second pseudo-pixels c1 and c2, the obtained second image was substantially equal to that in FIG. 11(b) in resolution and noise expansion suppressing effects. Moreover, the processing speed was increased by using the average instead of using complicated equations.

Figure 14:
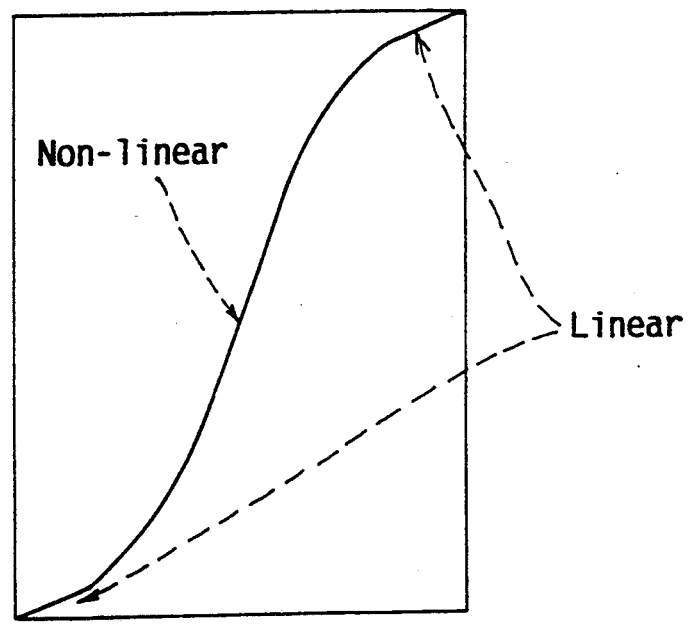
FIG. 14 is a graph showing input/output characteristics when a non-linear function and a linear function are synthesized.

In addition, a synthesized function of linear and non-linear functions, for example, one shown in FIG. 14, was used instead of the first and second functions. It turned out that using such a synthesized function scarcely eliminates the effects of the present invention. However, it is preferable to make a primary differential into a continuous non-linear function where it becomes discontinuous in order to prevent a pseudo-outline.

Figure 15A:
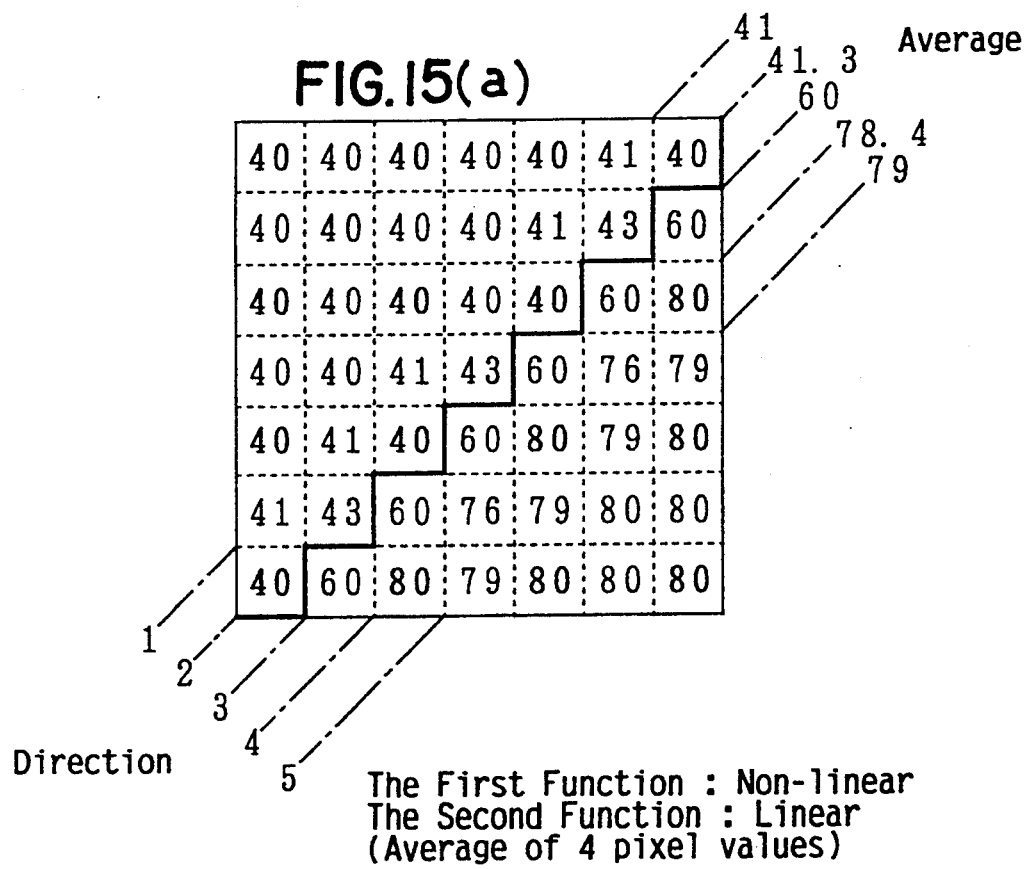
FIGS. 15(a) and (b) are views of the diagonal lines appear in comparative methods for interpolation.

The results of comparative examples using computation methods other than the above are shown in FIGS. 15(a) and (b) and 16.

Figure 15B:
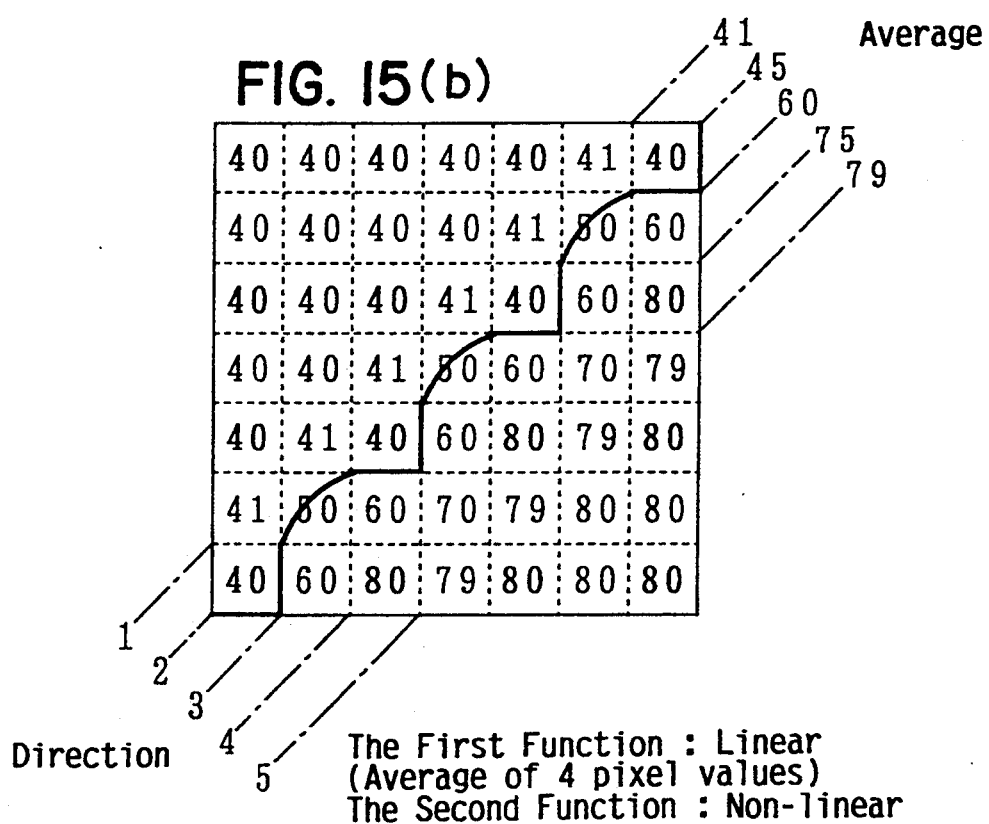

In the method of FIG. 15(a), the mapping values of the first function were used as the values of the first pseudo-pixels b, and the average of values of two neighboring pixels a and two of the neighboring first pseudo-pixels b was used as those of the second pseudo-pixels c1 and c2, respectively; in the method of FIG. 15(b), the average of values of the four neighboring pixels a was used as those of the first pseudo-pixels b, and the mapping values of the second function were used as the values of the second pseudo-pixels c1 and c2.

As can be seen from FIG. 15(a), resolution was maintained sufficiently high due to the fine notches in the diagonal line, while from FIG. 15(b), resolution was degraded as bad as the conventional method due to the rough notches. Thus, it can be said that at least the value of the first pseudo-pixels b must be computed by the non-linear function to maintain resolution and suppress noise expansion.

Figure 16:
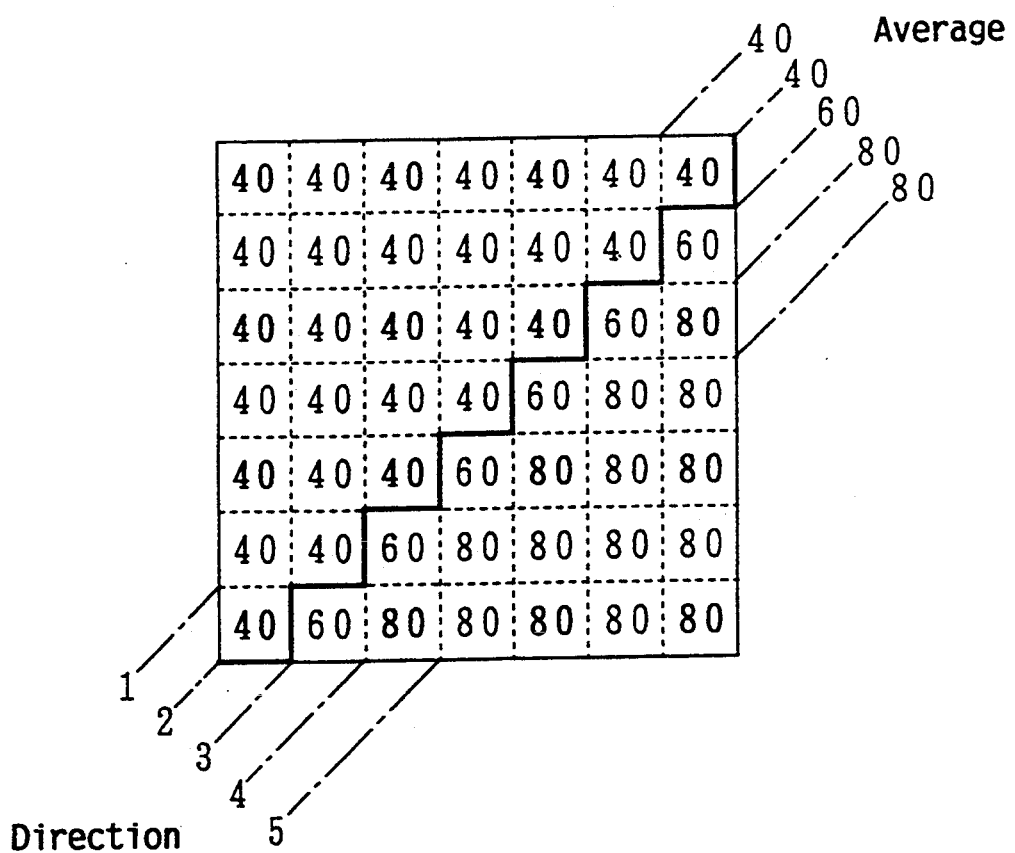
FIG. 16 is a view of the diagonal line appears in another comparative method for interpolation.

In the method in FIG. 16, the average of values of four neighboring pixels a or that of two neighboring pixels a and two of the first pseudo-pixels b excluding ones with the maximum and minimum values was used as input values of the first and second functions.

It turned out that the interpolation using this computation method retained the highest resolution and the most distinct diagonal line with the finest notches compared with all the examples and comparative examples.

The second function may be different from the first function, and they are not restricted to the one expressed by the expression [10]. Any monotonous increasing function may be used as long as the maximum, minimum and the central value of the range are consistent with those of the domain of definition. For example, the higher order function such as a cubic function and a trigonometric function expressed in respective equations [11] and [12] are also available.

$$F(x)=2(a-1)x^3-3(a-1)x^2+ax \qquad [11]$$

wherein the constant a is adjusted so that the value of the linear derivative function y' is a positive number when x is 0 to 1.

$$F(x) = \frac{1}{4}\left\{ 2x + 1 + \sin\left(\frac{\pi}{2}(2x-1)\right)\right\} \qquad [12]$$

In both the first and second functions, the maximum, minimum and central values of the range are consistent with those of the domain of definition. However, other functions may be applicable if three values other than the foregoing values of the former are consistent with those of the latter. In this case, the luminance of the second image can be adjusted, only if the value in the middle is in a range of 0.4 to 0.6. If the value in the middle is outside of this range, the second image becomes mosaic due to notable difference in value between the pixels and pseudo-pixels.

More than two non-linear functions may be used separately in accordance with the balances between the maximum and minimum values.

Although the microcomputer 3 loads the tables for first and second functions at each image expansion, the ROM may be used to store tables for respective functions used in the apparatus in advance to increase the processing speed.

The data, namely the pixel value, of the pixels a and first and second pseudo-pixels b, c1 and c2 are stored in the image memory 2 in the same arrangement of the second image. However, the image memory 2 may consist of an area for the pixels an area for the first and second pseudo-pixels b, c1 and c2 to store them separately or there may be a plurality of them.

The microcomputer 3 computes the values of the first pseudo-pixel b and second pseudo-pixels c1 and c2 in turn, but it may compute all those of the first pseudo-pixels b first, thence the second pseudo-pixels c1 and c2.

It is needless to say that a multiplication factor can be increased by expanding the expanded image repeatedly, although it becomes a two's power inevitably.

Second Embodiment

The apparatus in the second embodiment is designed so that it expands a full-color image consisting of a luminance component Y and tow color difference components R-Y and B-Y four times in a specific ratio, thus the values related to luminance and color difference are subject to computation herein.

Figure 17:
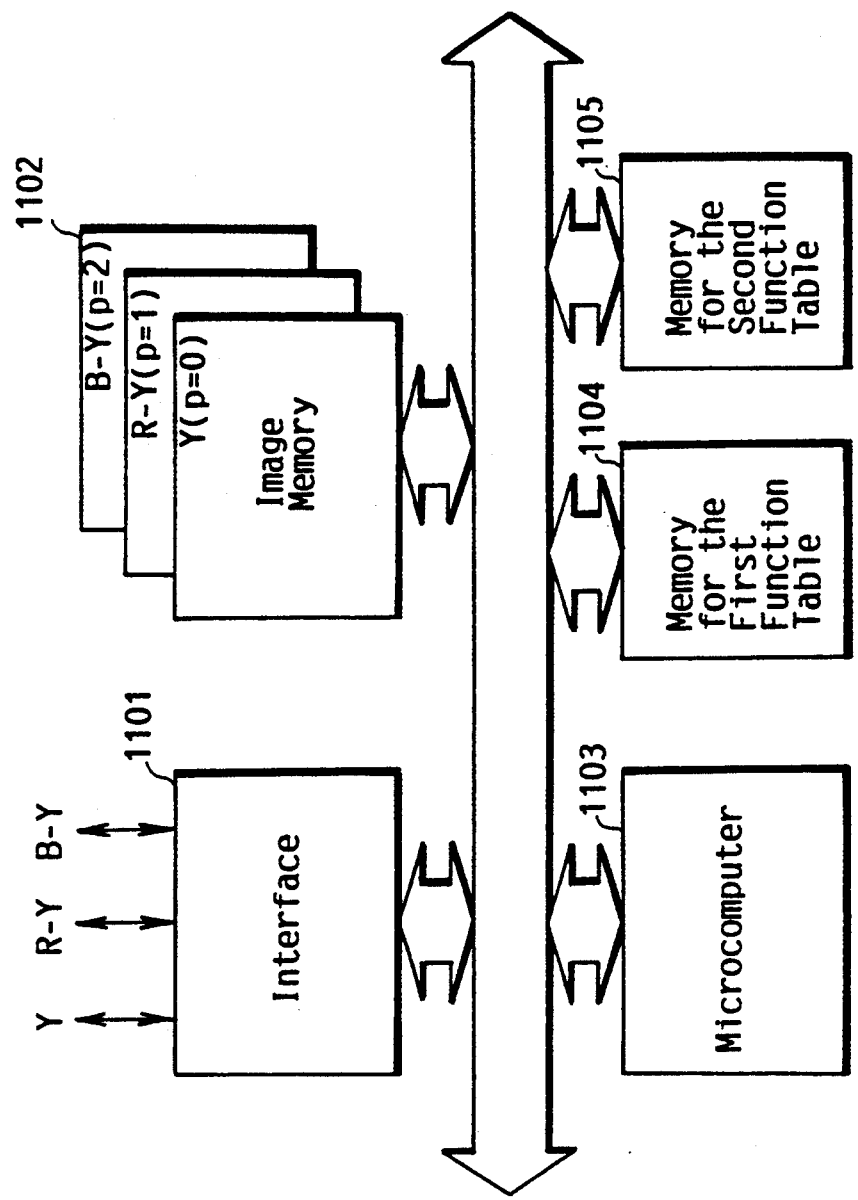
FIG. 17 is a block diagram of the apparatus for interpolating pseudo-pixels in the second embodiment.

As is shown in FIG. 17, the interpolating apparatus in accordance with the second embodiment is composed of an interface 1101, an image memory 1102, a micro computer 1103, a memory 1104 for the first function table, and another memory 1105 for the second function table.

The interface 1101 converts first image data consisting of a luminance component Y, two color difference components R-Y and B-Y into respective three 8-bit digital signals.

The image data 1102 consists of three pages and stores the first image and the second image data. More precisely, the page 0 stores the luminance component Y, the page 1 does the color difference component R-Y, and the page 2 does the color difference component B-Y.

The memory 4 stores the first function table, while the memory 5 does the second function table.

The apparatus constructed as above is controlled by the microcomputer 3, and the process of interpolation thereof comprises the five following steps:

1) The first average, maximum and minimum values related to luminance computing step.
2) The first mapping value computing step.
3) The second average, maximum and minimum values related to luminance computing step.
4) The second mapping value computing step.
5) The color-related values averaging step.

More precisely, the process of interpolation is described by referring to the flowcharts in FIGS. 18 to 21.

Figure 18:
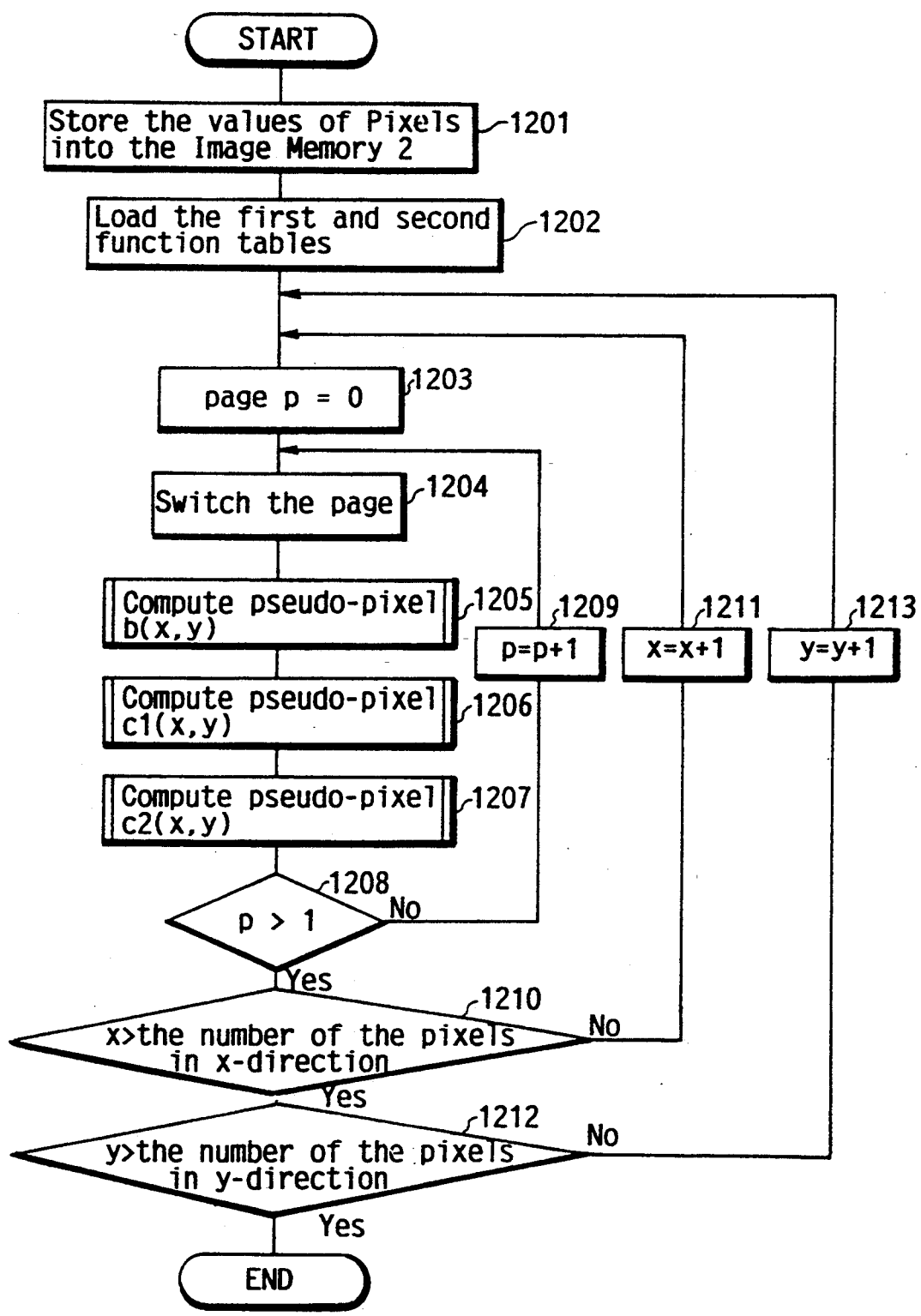
FIG. 18 is a main flowchart of the method of interpolation in the second embodiment.

In Step 1201 in FIG. 18, the microcomputer 3 writes the first image data converted into three 8-bit digital signal into predetermined cells of respective pages in the image memory 2, whose addresses in column and row are even numbers, thereby setting the initial coordinate (x, y).

In Step 1202, it loads the first and second function tables with mapping values for all input values in the same manner in the first embodiment.

In Step 1203, it selects the page 0 to compute the values related to the luminance component Y.

In Step 1204, it switches the page number in accordance with the kinds of components.

Figure 19:
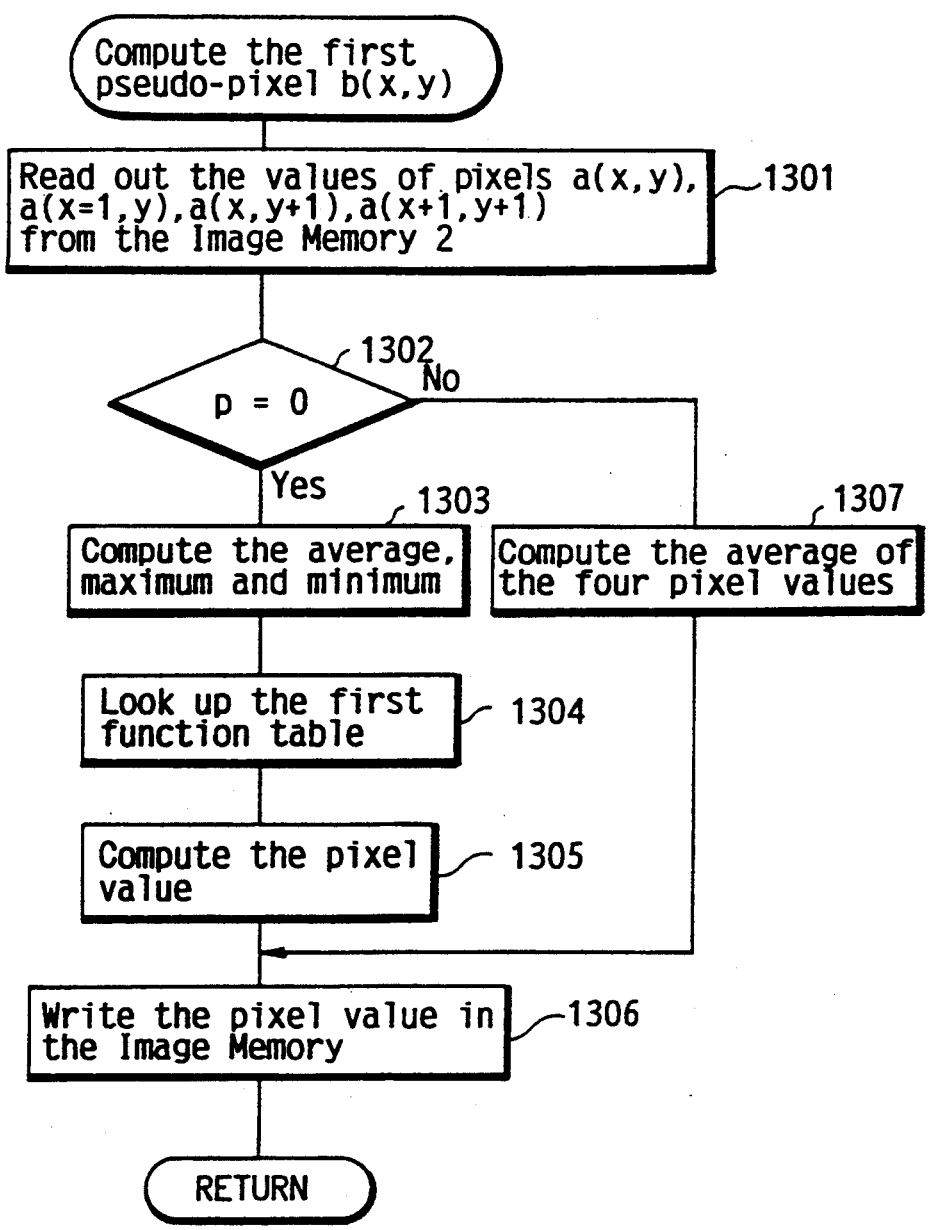
FIG. 19 is a flowchart of the process to compute the values of the first pseudo-pixels b.

In Step 1205, it computes the value of the first pseudo-pixels b(x,y), which is explained in detail by referring to a flowchart in FIG. 19.

In Step 1301, it reads out the values of four pixels a(x,y), a(x+1, y), a(x, y+1), and a(x+1, y+1) from the image memory 2.

In step 1302, it detects whether the values are related to the luminance component Y or color difference components R-Y and B-Y, and if they are the ones related to the luminance component Y, it goes to Step 1303; otherwise, it goes to Step 1307.

In Step 1303, it computes the ave1, max1 and min1.

In Step 1304, it computes an address ad1 in the first function table for ave1 using the equation [4]. Then, it looks up the first function table to find a value e1 for the ad1.

In Step 1305, it converts the value e1 into the mapping value D1 of actual scale using the equation [5].

In Step 1306, it writes the mapping value D1 as the value of the first pseudo-pixel b(x, y) into a predetermined address in the image memory 2.

In Step 1307, it computes the values related to the color difference components R-Y and B-Y by averaging out the values of the concerned pixels, then it goes to Step 1306.

Figure 20:
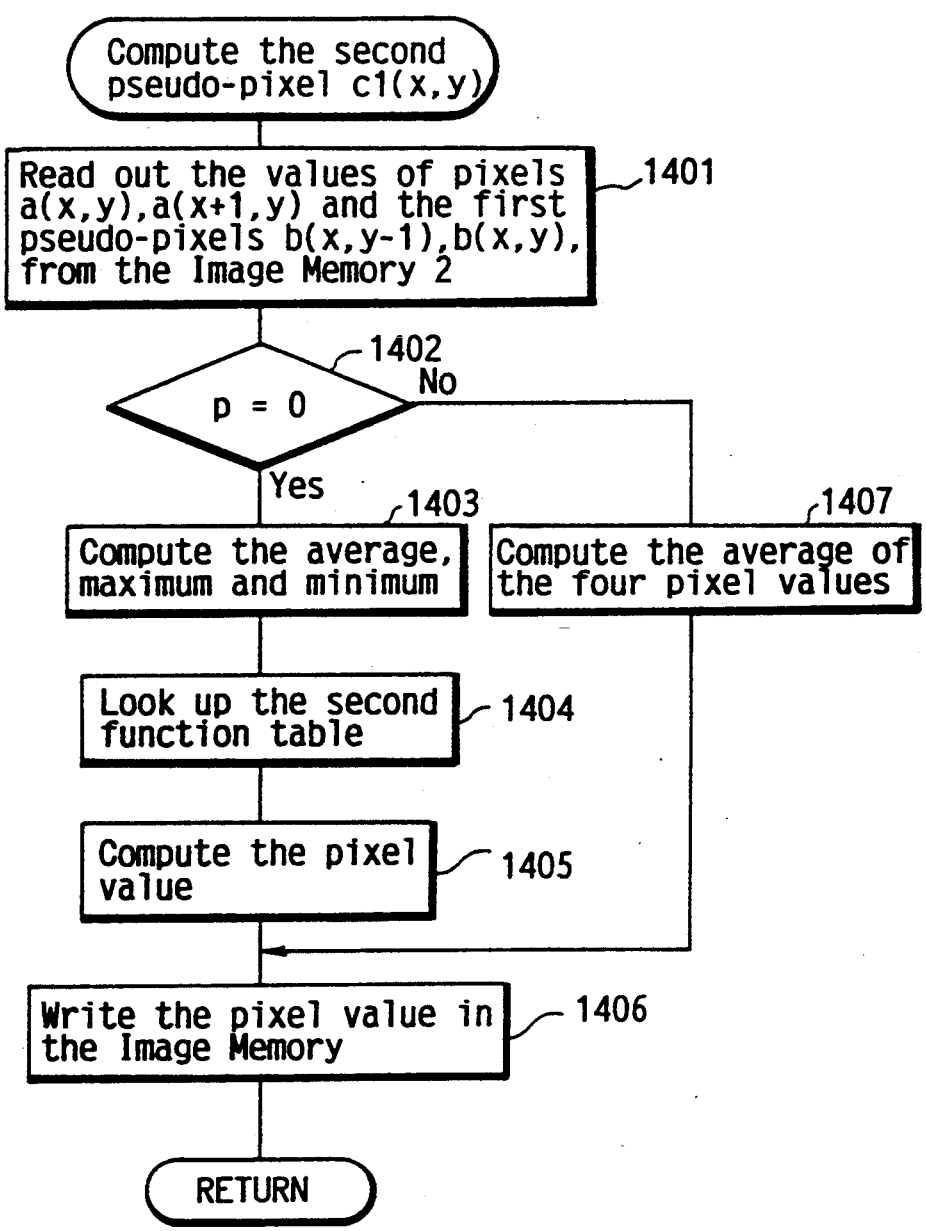
FIG. 20 is a flowchart of the process to compute the values of the second pseudo-pixels c1.

Following the computation of the values related both the luminance component Y and color difference components R-Y and B-Y of the first pseudo-pixel b(x,y), it computes the value of the second pseudo-pixel c1(x,y) in Step 1206 in FIG. 18, which is explained in detail by referring to a flowchart in FIG. 20.

In Step 1401, the microcomputer 3 reads out the values of two of the pixels a(x,y) and a(x+1, y) and the first pseudo-pixels b(x,y−1) and b(x,y) from the image memory 2.

In step 1402, it detects whether the values are related to the luminance component Y or color difference components R-Y and B-Y and if they are the ones related to luminance, it goes to Step 1403; otherwise, it jumps to Step 1407.

In Step 1403, it computes the ave2, max2 and min2.

In Step 1404, it computes an address ad2 in the first function table for ave2 using the equation [4]. Then, it looks up the second function table to find a value e2 for the ad2.

In Step 1405, it converts the value e2 into the mapping value D2 of actual scale using the equation [5].

In Step 1406, it writes the mapping value D2 as the value of the second pseudo-pixel c1(x, y) into a predetermined address in the image memory 2.

In Step 1407, it computes the values related to the color difference components R-Y and B-Y by averaging out the values of the concerned pixels and pseudo-pixels, then it goes to Step 1406.

Figure 21:
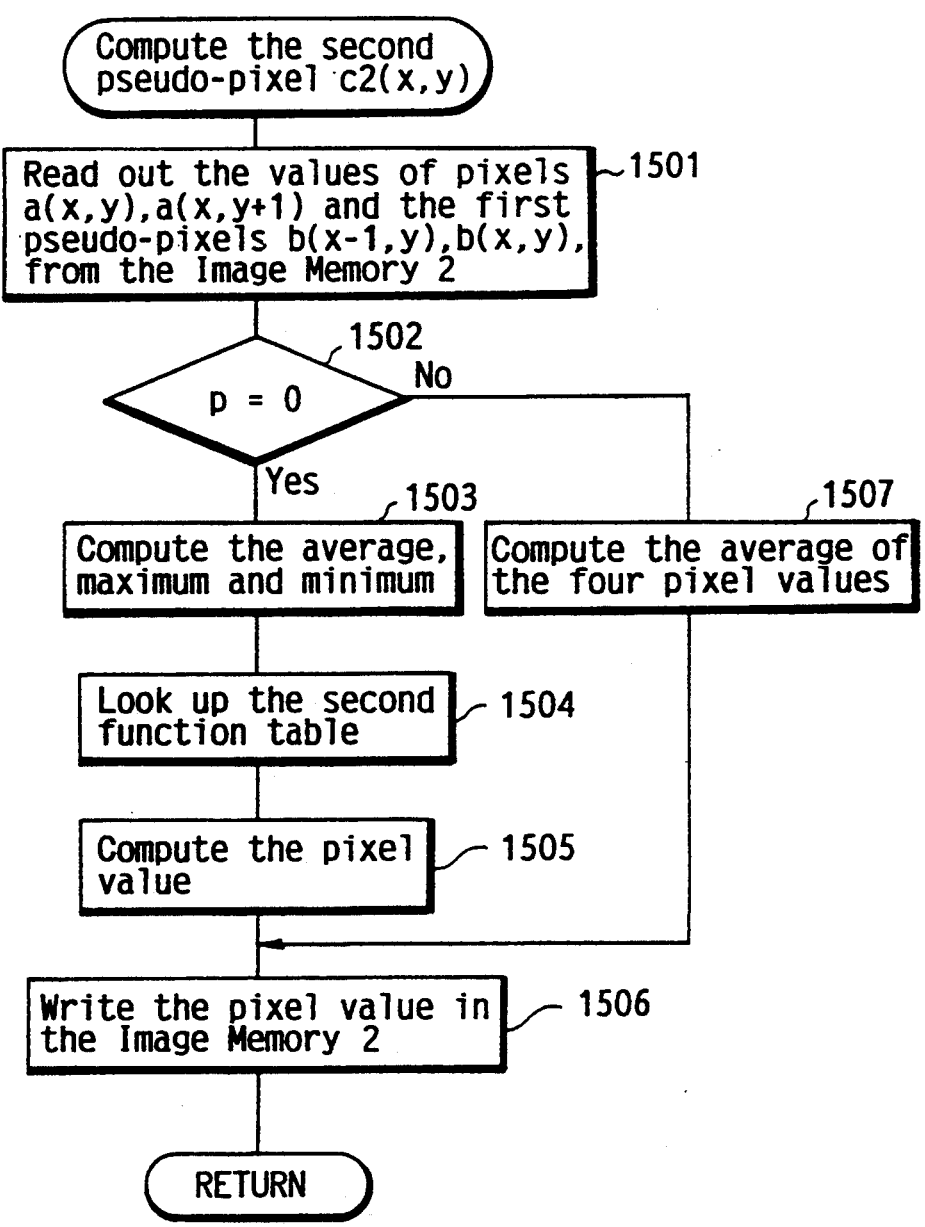
FIG. 21 is a flowchart of the process to compute the values of the second pseudo-pixels c2.

Following the computation of the values related both the luminance component Y and color difference components R-Y and B-Y of the second pseudo-pixel c1(x,y), it computes the values of the second pseudo-pixel c2(x,y) in Step 1207 in FIG. 18, which is explained in detail by referring to the flowchart in FIG. 21.

In Step 1501, the microcomputer 3 reads out the values of two of the pixels a(x,y) and a(x, y+1) and the first pseudo-pixels b(x,y) and b(x−1,y) from the image memory 2.

In step 1502, it detects whether the values are related to the luminance component Y or color difference components R-Y and B-Y, and if they are the one related to the luminance component Y, it goes to Step 1503; otherwise it jumps to Step 1507.

In Step 1503, it computes the ave3, max3 and min3.

In Step 1504, it computes an address ad3 in the second function table for ave3 using the equation [4]. Then, it looks up the second function table to find a value e3 for the ad3.

In Step 1505, it converts the value e3 into the mapping value D3 of actual scale using the equation [5].

In Step 1506, it writes the mapping value D3 as the value of the second pseudo-pixel c2(x, y) into a predetermined address in the image memory 2.

In Step 1507, it computes the values related to the color difference components R-Y and B-Y by averaging out the values of the concerned pixels a and the first pseudo-pixels b, then it goes to Step 1506.

In Step 1208 in FIG. 18, it checks whether all the pseudo-pixels in respective pages are interpolated by checking if the page number is larger than 1. If so, it goes to Step 1209; otherwise it jumps to Step 1210.

In Step 1209, it adds a value 1 to the page number, then returns to Step 1203.

In Step 1210, it checks whether all the pseudo-pixels in the x-direction are interpolated by comparing the number of the pixels in the x-direction with that of the current x. If the former is greater than the latter, it jumps to Step 1212; otherwise, it jumps to Step 1211.

In Step 1211, it adds a value 1 to the number of the current x and returns to Step 1203.

In Step 1212, it checks whether all the pseudo-pixels in the y-direction are interpolated by comparing the number of the pixels in the y-direction with that of current y. If the former is greater than the latter, it terminates the operation; otherwise, it goes to Step 1213.

In Step 1213, it adds a value 1 to the number of the current y and returns to Step 1203.

Strictly speaking, to compute the values of the second pseudo-pixels c1(0,0) and c2(0,0) neighboring to the end pixel a(0,0), those of the first pseudo-pixels b(0,−1) and b(−1,0) are necessary in the above method. However, as the values of such first pseudo-pixels b are not stored in the image memory 2 in fact, the microcomputer 3 averages the values of the two pixels a(0,0) and a(1,0), and those of the two pixels 1(0,0) and a(0,1) and uses the results for the respective computation.

To visualize the effects of the present invention, a full color image in 480×640 dots as an example was expanded in the same manner of the first embodiment. As was acknowledged in the first embodiment, resolution was upgraded and noise expansion was suppressed with the second image expanded by the present invention compared with the one by the conventional method.

As a comparative example, the microcomputer 3 computed the values related to the color difference components R-Y and B-Y of the pseudo-pixels by averaging out the values of the concerned pixels and/or the first pseudo-pixels, and substantially the same effects were witnessed.

Likewise, RGB(Red, Green Blue) data or CMY-(Cyan, Magenta, Yellow) data were used instead of the color difference components R-Y and B-Y, and the effects were almost the same. However, it is preferable to convert the RGB data or CMY data into the luminance component Y and color difference components R-Y and B-Y prior to the interpolation, and re-converted into the original after the interpolation in preventing degradation of color and hue.

Third Embodiment

The apparatus in accordance with the third embodiment is designed so that it compresses the expanded image to an arbitrary ratio.

The apparatus herein has the same construction as the one shown in FIG. 3, except that the microcomputer 3 includes additionally a function of compression. Hereinafter, like components are labeled with like reference numerals with respect to the first embodiment, and the description of these component is not repeated.

Figure 22:
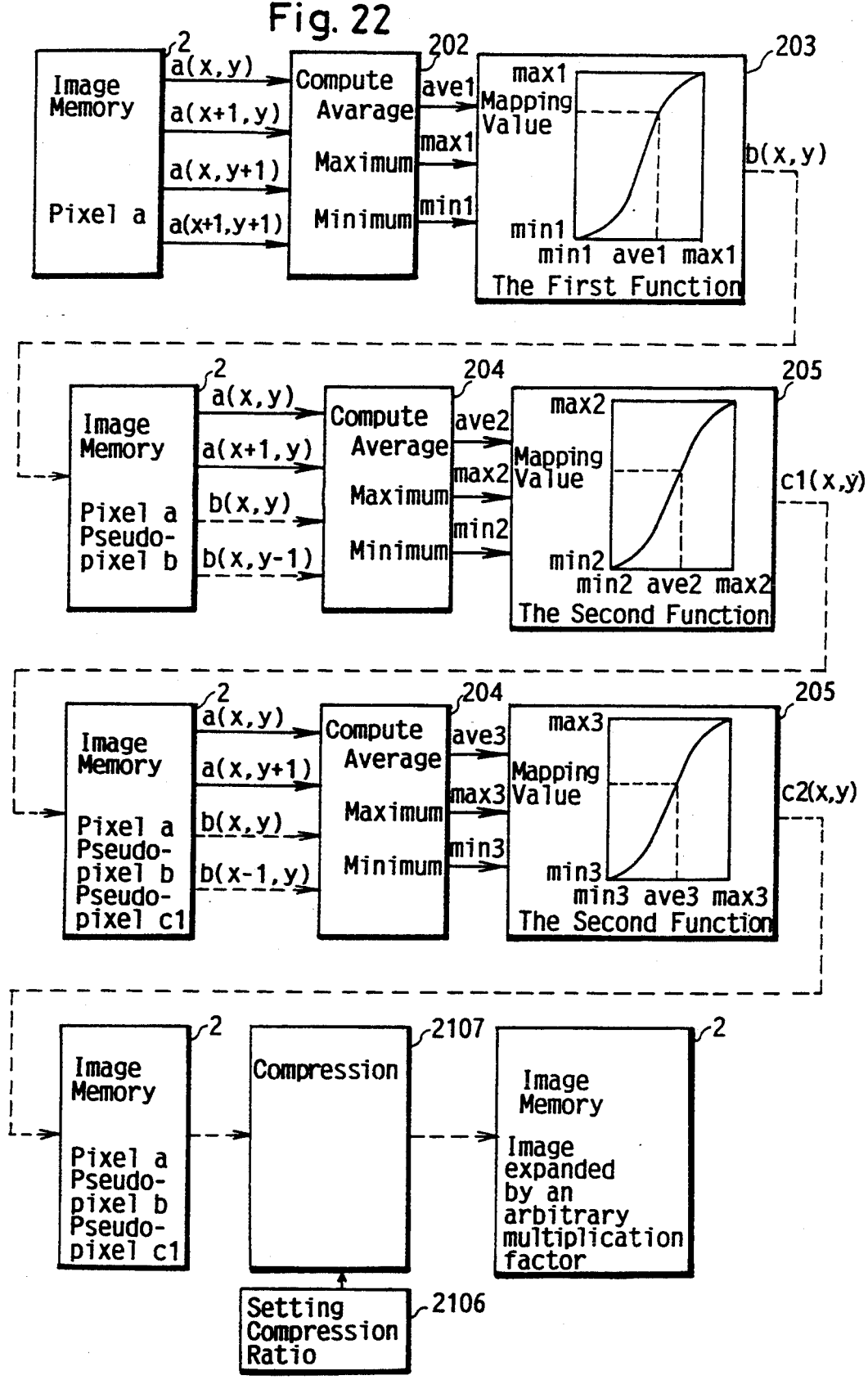
FIG. 22 is a flow diagram of the method of interpolation in the third embodiment.

The method of compression comprises six steps: a step of setting a compression ratio and a step of compressing in addition to the four steps explained in the first embodiment. These two additional steps are explained in detail by referring to the flow diagram in FIG. 22.

Figure 23A:
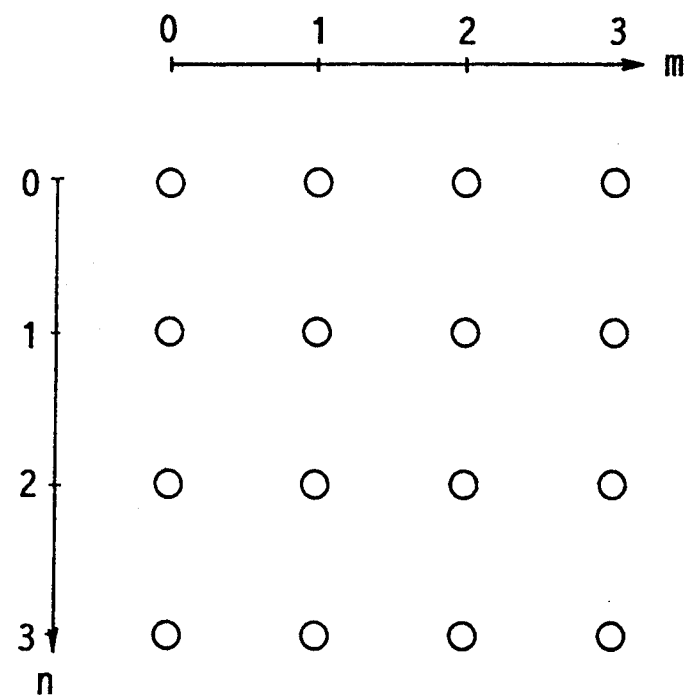
FIG. 23(a) is a view of pixels prior to compression.

Preceding to Step 2106, the image memory 2 has stored the data related to the expanded image referred to as the fist image in this embodiment. FIG. 23(a) is a view of the first image consisting of 16 pixels, four in a row, or the m-direction, and four in a column, or the n-direction.

In Step 2106, the microcomputer 3 sets a compression ratio k used in Step 2107, which is an any arbitrary number greater than $\frac{1}{2}$ and less than 1.

Figure 23B:
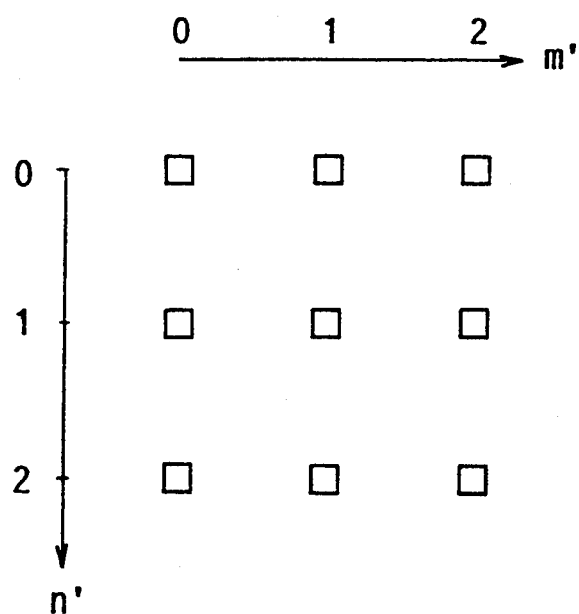
FIG. 23(b) is a view of pixels after compression.

In Step 2107, it compresses the first image (m,n) to k'th, and a compressed image (m',n') is shown in FIG. 23(b).

Figure 24:
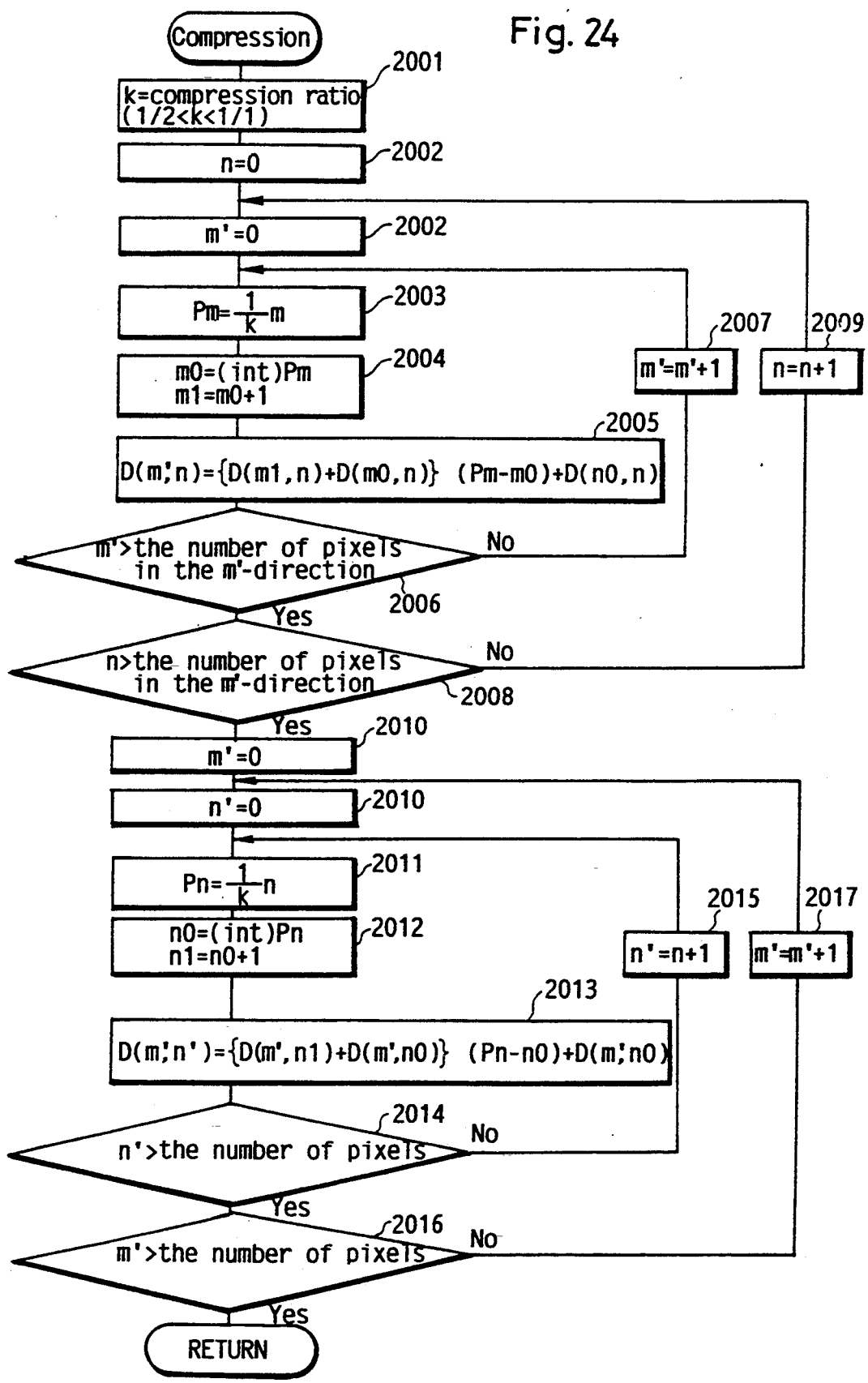
FIG. 24 is a flowchart of the method of compression.

More precisely, the method of compression is explained in detail by referring to the flowchart in the FIG. 24.

In Step 2001, it sets an arbitrary compression ratio k, for example, $\frac{3}{4}$ herein.

In Step 2002, it sets an initial address (0,0) prior to compression along the m-direction.

Figure 25A:
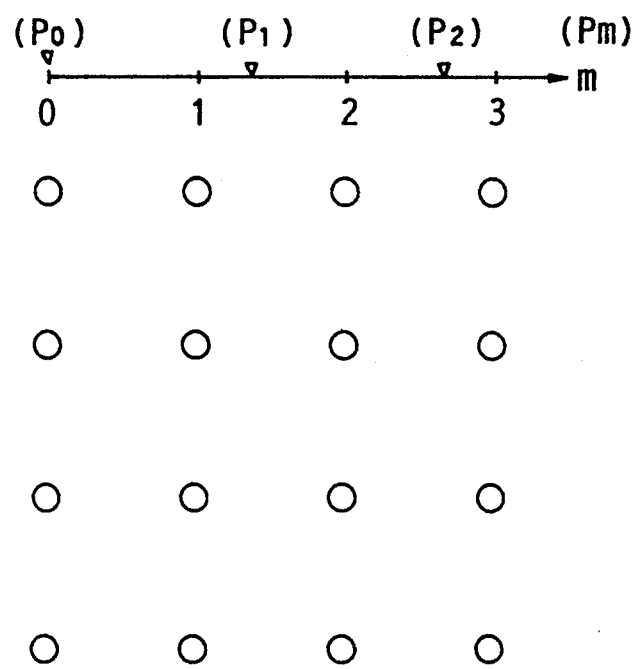
FIG. 25(a) is a view of pixels prior to compression.

In Step 2003, it computes an address in the first image to which an address of the pixel in the compressed image corresponds using the equation [13] below. The corresponding address is referred to as Pm and shown in FIG. 25(a), wherein a symbol ◯ denotes a pixel prior to compression. The Pm is not necessarily an integer.

$$Pm = (1/K)m \quad [13]$$

In Step 2004, it computes the addresses of the two pixels m0 and m1 neighboring to the right and left of the Pm in the first image using the equation [14].

m0=int(Pm), wherein decimals are omitted.
$$m1 = m0 + 1 \quad [14]$$

Figure 25B:
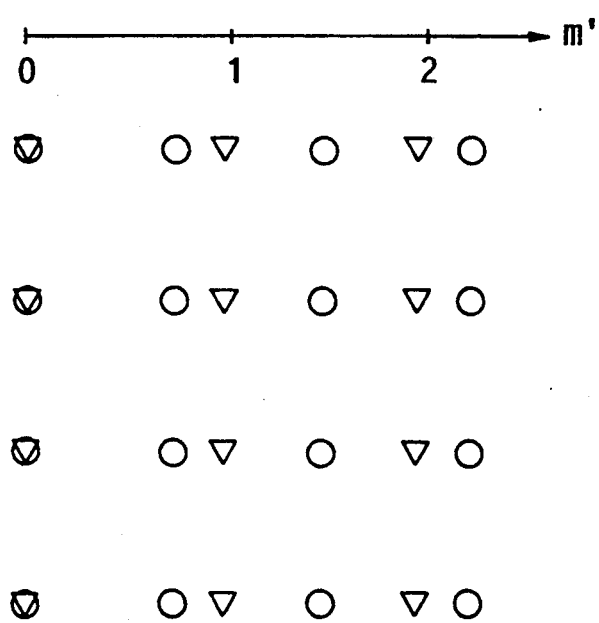
FIG. 25(b) is a view of pixels compressed along the m-direction.

In Step 2005, it computes the values of the pixel located in Pm(m', n). Since the distance ratio of Pm to its two neighboring pixels' addresses (m0,n) and (m1,n) are expressed as Pm-m0: 1-(Pm-m0), the value thereof can be computed by internally dividing the values of the two neighboring pixels with a reverse ratio 1-(Pm-m0): Pm-m0, which is given by the equation [15] below. Then, it writes the obtained value into the image memory 2 as the value of the pixel in the Pm. The image compressed along the m-direction as a result is shown in FIG. 25(b), wherein a symbol ▽ denotes a pixel after the compression.

$$\begin{aligned} D(m',n) &= \{1 - (Pm - m0)\}D(m0,n) + (Pm - m0)D(m1,n) \\ &= \{D(m1,n) - D(m0,n)\}(Pm - m0) + D(m0,n) \end{aligned} \quad [15]$$

In Steps 2006, it checks whether all the values of pixels in the m'-direction are computed by comparing the number of the pixels in the m'-direction with that of the current m'. If the former is greater than the latter, it jumps to Step 2008; otherwise, it goes to Step 2007.

In Step 2007, it adds a value 1 to the number of the current m' and returns to Step 2003.

In Step 2008, it checks whether all the values of pixels in the n-direction are computed by comparing the number of the pixels in the n-direction with that of the current n. If the former is greater than the latter, it jumps to Step 2010; otherwise it goes to Step 2009.

In Step 2009, it adds a value 1 to the number of the current n and returns to Step 2002.

In Step 2010, it sets an initial address (m', n') prior to compression along the n-direction.

Figure 26A:
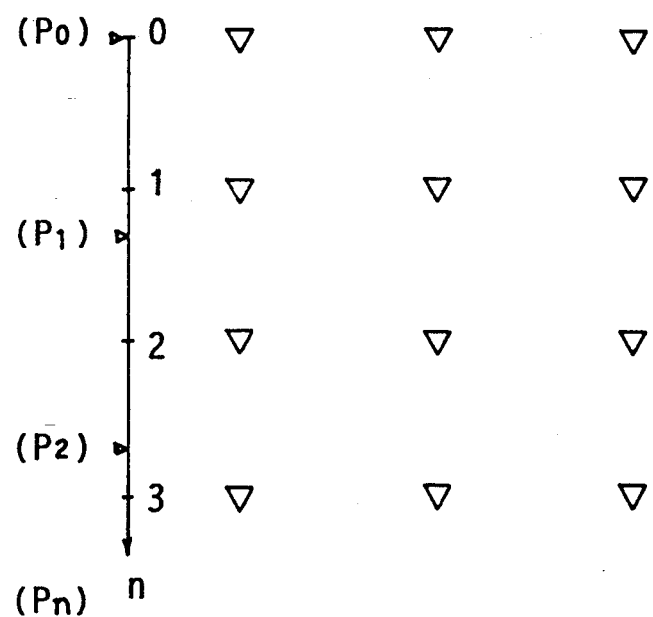
FIG. 26(a) is a view of pixels prior to compression n-direction.

In Steps 2011, it computes an address in the first image to which an address of the pixel in the compressed image corresponds using the equation [16] below. The corresponding address is referred to as Pn and shown in FIG. 26(a), wherein a symbol ▽ denotes a pixel prior to compression. The Pn is not necessarily an integer.

$$Pn = (1/K)n \qquad [16]$$

In Step 2012, it computes the addresses of the two pixels n0 and n1 neighboring to the right and left of the Pn in the first image using the equation [17].

n0 = int(Pn), wherein decimals are omitted.
n1 = n0 + 1 $\qquad [17]$

Figure 26B:
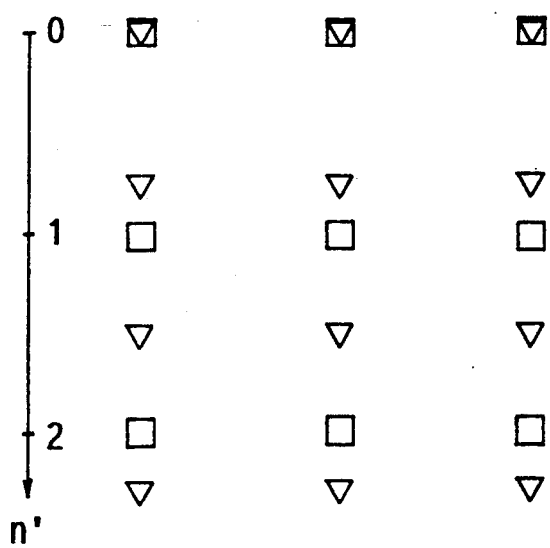
FIG. 26(b) is a view of pixels compressed along the n-direction.

In Step 2013, it computes the values of the pixel located in the address (m',n'). Since the distance ratio of Pn to its two neighboring pixels' addresses (m',n0) and (m',n1) are expressed as Pn-n0: 1-(Pn-n0), the value thereof can be computed by internally dividing the values of the two neighboring pixels with a reverse ratio 1-(Pn-n0): Pn-n0, which is given by the equation [18] below. Then, it writes the value into the image memory 2 as the value of the pixel in the Pn. The image compressed along both the m- and n-direction as a result is shown in FIG. 26(b), wherein a symbol □ denotes a pixel after the compression.

$$\begin{aligned} D(m',n') &= \{1 - (Pn - n0)\}D(m',n0) + (Pn - n0)D(m',n1) \\ &= \{D(m',n') - D(m',n1)\}(Pn - n0) + D(m',n0) \end{aligned} \qquad [18]$$

In Steps 2014, it checks whether all the values of pixels in the n'-direction are computed by comparing the number of the pixels in the n'-direction with that of the current n'. If the former is greater than the latter, it jumps to Step 2016; otherwise, it goes to Step 2015.

In Step 2015, it adds a value 1 to the number of the current n' and returns to Step 2011.

In Step 2016, it checks whether all the values of pixels in the m'-direction are computed by comparing the number of the pixels in the m'-direction with that of the current m'. If the former is greater than the latter, it terminates the operation; otherwise, it goes to Step 2017.

In Step 2017, it adds a value 1 to the number of the current n' and returns to Step 2010.

Thus, with the apparatus explained as above, when one wishes to expand an image 1.5 times in length and width, the original image is expanded twice (four times in a specific ratio), thence compressed to ¾th, which is explained by $$1 \times 2 \times \tfrac{3}{4} = 3/2$$

In the above method, it is essential to limit the range of the compression ratio k from ½ to 1 in terms of resolution and increasing processing speed: when the compression ratio k is greater than 1, it is better to expand the expanded image repeatedly, thence compress the sufficiently expanded image; and when the compression ratio k is smaller ½, it is better to compress the original image directly.

Thus, it can be concluded that a combination of expansion and compression described above makes it possible to expand the original image by any arbitral multiplication factor, whereas the expansion in the first and second embodiments is limited to a two's power.

Fourth Embodiment

The apparatus in accordance with the fourth embodiment is designed so that it determines whether to use the average value or a mapping value depending on a correlation in the values between the pixels.

The apparatus herein has the same construction as the one shown in FIG. 3 except that the microcomputer 3 includes additionally a function of detecting a correlation. Hereinafter, like components are labeled with like reference numerals with respect to the first embodiment, and the description of these component is not repeated.

Figure 27:
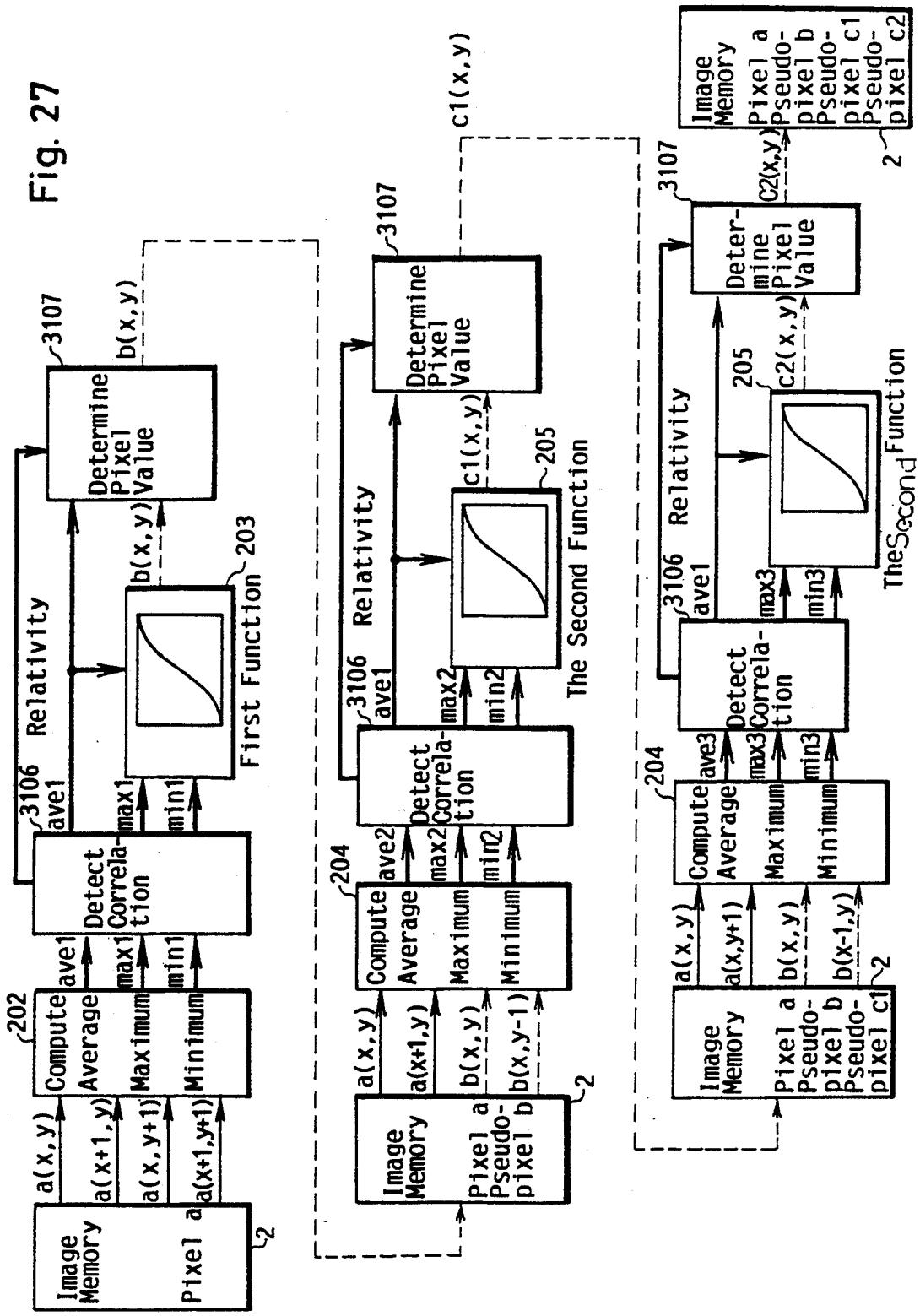
FIG. 27 is a flow diagram of the method of interpolation in the fourth embodiment.

The method of detecting correlation comprises six steps: a step of subtracting the minimum value from the maximum value, and a step of determining the value of the pseudo-pixel by selecting one of the average of values of the concerned pixels and/or pseudo-pixels and a mapping value in addition to the four steps described in the first embodiment. These two additional steps are explained by referring to the flow diagram in FIG. 27.

Preceding to Step 3106, the image memory 2 has stored the first image data, and the microcomputer 3 has computed the ave1, max1 and min1.

In Step 3106, the microcomputer 3 subtracts the minimum value from the maximum value of the concerned pixels a and/or the first pseudo-pixels b, and when the balance thereof is smaller than a certain value, it judges there is correlation.

In Step 3107, it determines if it uses the average of value or a mapping value for the values of the first and second pseudo-pixels based on the result in Step 3106.

Figure 28:
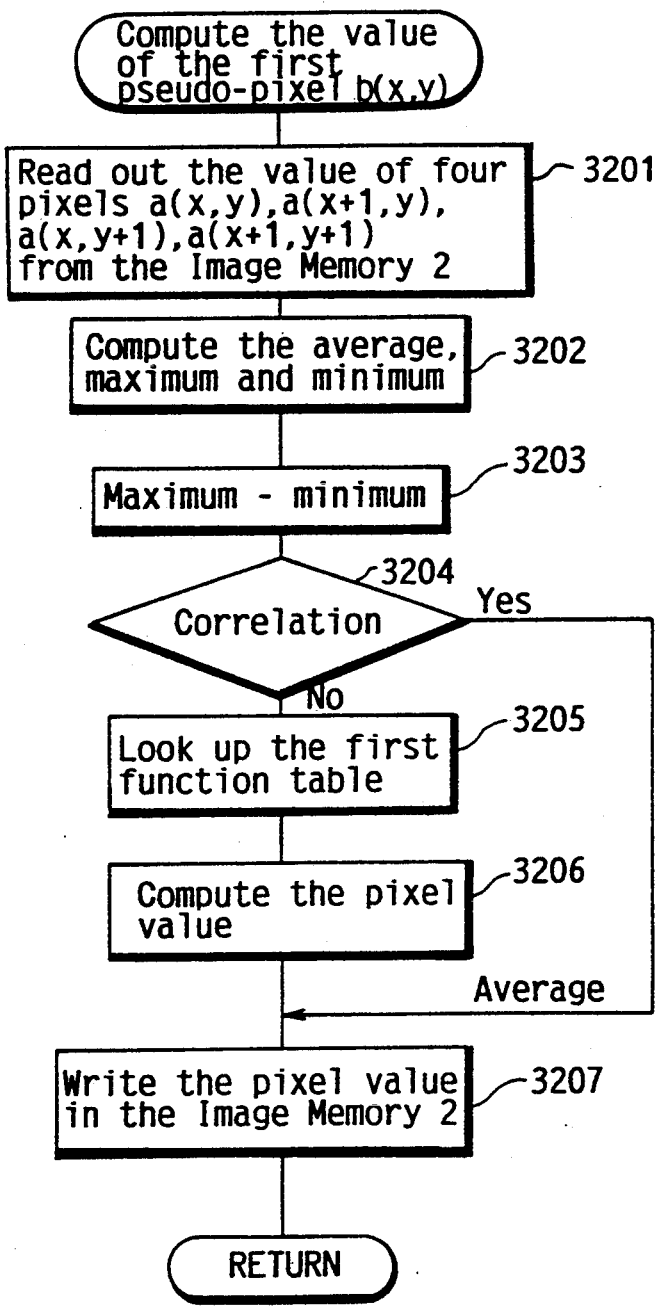
FIG. 28 is a flowchart of the process to compute the values of the pseudo-pixels by detecting a correlation in values between the concerned pixels and/or pseudo-pixels.

More precisely, the method of detecting a correlation is explained in detail by referring to the flowchart in FIG. 28.

In Step 3201, the microcomputer 3 reads out the values of four pixels a(x, y), a(x+1,y), a(x, y+1) and a(x+1, y+1).

In Step 3202, it computes the ave1, max1 and min1.

In Step 3203, it subtracts the min1 from the max1.

In Step 3204, it compares the balance with a certain value; when the balance is smaller than certain value, it judges there is a correlation and jumps to Step 3207; otherwise, it goes to Step 3205.

In Step 3205, it looks up the first function table.

In Step 3206, it computes the mapping value D1.

In Step 3207, it writes the average value when there is a correlation, and the mapping value D1 when there is no correlation as the value of the first pseudo-pixel b(x, y).

The way to compute the value of the first pseudo-pixel b was explained as an example, but it is needless to say the values of the second pseudo-pixels c1 and c2 are computed in the same manner.

Given that the resolution degradation is negligible when there is not much difference in value in the first image, this method enables the high-speed interpolation without degrading resolution.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four pixels by averaging out the four pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = min1 + \frac{max1 - min1}{Max1 - Min1} \left\{ F1 \left( \frac{ave1 - min1}{max1 - min1} (Max1 - Min1) + Min1 \right) - Min1 \right\};$$

first writing circuitry for writing the value of the first pseudo-pixel into the image memory;

a second computer unit for computing a second average value, a maximum value, and a minimum value of two of the four pixels and two of the first pseudo-pixels neighboring to the second pseudo-pixel (hereinafter last-mentioned four pixels), and for computing the second average value of the last-mentioned four pixels by averaging out the last-mentioned four pixels, each being referred to as max2, min2 and ave2;

second mapping circuitry for computing a mapping value for ave2 to be stored in the image memory as the value of the second pseudo-pixel by using a second function F2 which is a monotonous increasing non-linear function ranging from Min2 to Max2, whose minimum value and maximum value in the range and those of the domain of definition are consistent with the Min2 and the Max2, and given by $$D2 = min2 + \frac{max2 - min2}{Max2 - Min2} \left\{ F2 \left( \frac{ave2 - min2}{max2 - min2} (Max2 - Min2) + Min2 \right) - Min2 \right\};$$

second writing circuitry for writing the value of the second pseudo-pixel into the image memory; and image-forming circuitry for forming the second image by adding the first and second pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

2. The apparatus of claim 1, wherein the first function F1 and the second function F2 when plotted, form S-shaped curves, respectively, each of the functions having a coinciding point where an input value and an output value of the respective function are equal, the input value being smaller than the output value at a point larger than the coincident point within the domain of definition, and the input value being larger than the output value at a point smaller than the coinciding point.

3. The method of claim 2, wherein the coinciding point is located in a vicinity of a median value of a domain of definition.

4. The apparatus of claim 3, wherein the first mapping means includes:

a first function table for storing mapping values for input values of the first function F1 by corresponding the input values to its addresses; and a first determining unit for the value of pixels for finding a corresponding mapping value based on the max1, min1 and ave1 by referring to the first function table.

5. The apparatus of claim 4, wherein the second mapping means includes:

a second function table for storing mapping values for input values of the second function F2 by corresponding the input values to its addresses; and a second determining unit for the value of pixels for finding a corresponding mapping value based on the max2, min2 and ave2 by referring to the second function table.

6. The apparatus of claim 5, wherein the first image consists of a luminance component which constitutes a color image together with two color difference components, and it computes the values of two color difference components for interpolation using a linear function.

7. The apparatus of claim 5, wherein the apparatus further comprises compressing means including:

a first unit for compressing the scale of the pixel array in a first direction; and a second unit for compressing the scale of the pixel array in a second direction which is orthogonal to the first direction.

8. The apparatus of claim 7, wherein the first unit includes three sub-units for each pixel after compression:

a first sub-unit for computing a location in the original scale corresponding to the pixel after compression using an equation $Pm = (1/k)m$, wherein k is a compression ratio greater than ½ and less than 1, and m is an address in the first direction in the image prior to compression;

a second sub-unit for computing addresses of the pixels m0 and m1 neighboring to the pixel in the Pm using an equation m0=int(Pm), wherein decimals are omitted
m1=m0+1; and a third sub-unit for computing a value E of the pixel in the Pm through an internally division using an equation E=(E1-E0)(Pm-m0)+E0, wherein E0 and E1 are the values of the pixels in m0 and m1, respectively, and wherein the second unit includes three sub-units for each pixel after compression:

a first sub-unit for computing a location in the original scale corresponding to the pixel after compression using an equation Pn=(1/k)n, wherein k is a compression ratio greater than ½ and less than 1, and n is an address in the second direction in the image prior to compression;

a second sub-unit for computing addresses of the pixels n0 and n1 neighboring to the pixel in the Pn using an equation n0=int(Pn), wherein decimals are omitted
n1=n0+1; and a third sub-unit for computing a value G of the pixel in the Pn through an internal division using an equation G=(G1-G0)(Pn-n0)+G0, wherein G0 and G1 are the values of the pixels in n0 and n1, respectively.

9. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four neighboring pixels by averaging out the four pixels each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = \min 1 + \frac{\max 1 - \min 1}{\text{Max}1 - \text{Min}1}\left\{F1\left(\frac{\text{ave}1 - \min 1}{\max 1 - \min 1}(\text{Max}1 - \text{Min}1) + \text{Min}1\right) - \text{Min}1\right\};$$

first writing circuitry for writing the value of the first pseudo-pixel into the image memory;

average determining means for computing the average of the values of the four neighboring pixels to store the computed average value in the image memory as the value of the second pseudo-pixel; and image forming circuitry for forming the second image by adding the five pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

10. The apparatus of claim 9, wherein the first function F1, when plotted, forms an S-shaped curve, the function having a coinciding point where an input value and an output value of the function are equal, the input value being smaller than the output value at a point larger than the coincident point within the domain of definition, and the input value being larger than the output value at a point smaller than the coinciding point.

11. The apparatus of claim 10, wherein the coinciding point is located in a vicinity of a median value of a domain of definition.

12. The apparatus of claim 11, wherein the first mapping means includes:

a first function table for storing mapping values for input values of the first function F1 by corresponding the input values to its addresses; and a first determining unit for the value of pixels for finding a corresponding mapping value based on the max1, min1 and ave1 by referring to the first function table.

13. The apparatus of claim 12, wherein the first image consists of a luminance component which constitutes a color image together with two color difference components, and it computes the values of two color difference components for interpolation using a linear function.

14. The apparatus of claim 12, wherein the apparatus further comprises compressing means including:

a first unit for compressing the scale of the pixel array in a first direction; and a second unit for compressing the scale of the pixel array in a second direction which is orthogonal to the first direction.

15. The apparatus of claim 14, wherein
the first unit includes three sub-units for each pixel after compression:

a first sub-unit for computing a location in the original scale corresponding to the pixel after compression using an equation Pm=(1/k)m, wherein k is a compression ratio greater than ½ and less than 1, and m is an address in the first direction in the image prior to compression;

a second sub-unit for computing addresses of the pixels m0 and m1 neighboring to the pixel in the Pm using an equation m0=int(Pm), wherein decimals are omitted
m1=m0+1; and a third sub-unit for computing a value E of the pixel in the Pm through an internal division using an equation $E = (E1-E0)(Pm-m0)+E0$, wherein E0 and E1 are the values of the pixels in m0 and m1, respectively, and wherein the second unit includes three sub-units for each pixel after compression:

a first sub-unit for computing a location in the original scale corresponding to the pixel after compression using an equation $Pn = (1/k)n$, wherein k is a compression ratio greater than ½ and less than 1, and n is an address in the second direction in the image prior to compression;

a second sub-unit for computing addresses of the pixels n0 and n1 neighboring to the pixel in the Pn using an equation $n0 = int(Pn)$, wherein decimals are omitted
$n1 = n0 + 1$; and a third sub-unit for computing a value G of the pixel in the Pn through an internal division using an equation $G = (G1-G0)(Pn-n0)+G0$, wherein G0 and G1 are the values of the pixels in n0 and n1, respectively.

16. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four pixels by averaging out the four pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = min1 + \frac{max1 - min1}{Max1 - Min1} \left\{ F1 \left( \frac{ave1 - min1}{max1 - min1} (Max1 - Min1) + Min1 \right) - Min1 \right\};$$

first writing circuitry for writing the value of the first pseudo-pixel into the image memory;

a second computer unit for computing a second average value, a maximum value, and a minimum value of two of the four pixels and two of the first pseudo-pixels neighboring to the second pseudo-pixel (hereinafter last-mentioned four pixels), and for computing the second average value of the last-mentioned four pixels by averaging out two of the last-mentioned four pixels excluding the maximum value and the minimum value pixels, each being referred to as max2, min2 and ave2;

second mapping circuitry for computing a mapping value for ave2 to be stored in the image memory as the value of the second pseudo-pixel by using a second function F2 which is a monotonous increasing non-linear function ranging frown Min2 to Max2, whose minimum value and maximum value in the range and those of the domain of definition are consistent with the Min2 and the Max2, and given by $$D2 = min2 + \frac{max2 - min2}{Max2 - Min2} \left\{ F2 \left( \frac{ave2 - min2}{max2 - min2} (Max2 - Min2) + Min2 \right) - Min2 \right\};$$

second writing circuitry for writing the value of the second pseudo-pixel into the image memory; and image-forming circuitry for forming the second image by adding the first and second pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

17. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four pixels by averaging out two of the four pixels excluding the maximum value and the minimum value pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = min1 + \frac{max1 - min1}{Max1 - Min1} \left\{ F1 \left( \frac{ave1 - min1}{max1 - min1} (Max1 - Min1) + Min1 \right) - Min1 \right\};$$

first writing circuitry for writing the value of the first pseudo-pixel into the image memory;

a second computer unit for computing a second average value, a maximum value, and a minimum value of two of the four pixels and two of the first pseudo-pixels neighboring to the second pseudo-pixel (hereinafter last-mentioned four pixels), and for computing the second average value of the last-mentioned four pixels by averaging out the last-mentioned four pixels, each being referred to as max2, min2 and ave2;

second mapping circuitry for computing a mapping value for ave2 to be stored in the image memory as the value of the second pseudo-pixel by using a second function F2 which is a monotonous increasing non-linear function ranging from Min2 to Max2, whose minimum value and maximum value in the range and those of the domain of definition are consistent with the Min2 and the Max2, and given by $$D2 = \min2 + \frac{\max2 - \min2}{Max2 - Min2}\left\{F2\left(\frac{ave2 - \min2}{\max2 - \min2}(Max2 - Min2) + Min2\right) - Min2\right\};$$

second writing circuitry for writing the value of the second pseudo-pixel into the image memory; and image-forming circuitry for forming the second image by adding the first and second pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

18. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four pixels by averaging out two of the four pixels excluding the maximum value and the minimum value pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = \min1 + \frac{\max1 - \min1}{Max1 - Min1}\left\{F1\left(\frac{ave1 - \min1}{\max1 - \min1}(Max1 - Min1) + Min1\right) - Min1\right\};$$

first writing circuitry for writing the value of the first pseudo-pixel into the image memory;

a second computer unit for computing a second average value, a maximum value, and a minimum value of two of the four pixels and two of the first pseudo-pixels neighboring to the second pseudo-pixel (hereinafter last-mentioned four pixels), and for computing the second average value of the last-mentioned four pixels by averaging out two of the last-mentioned four pixels excluding the maximum value and the minimum value pixels, each being referred to as max2, min2 and ave2;

second mapping circuitry for computing a mapping value for ave2 to be stored in the image memory as the value of the second pseudo-pixel by using a second function F2 which is a monotonous increasing non-linear function ranging from Min2 to Max2, whose minimum value and maximum value in the range and those of the domain of definition are consistent with the Min2 and the Max2, and given by $$D2 = \min2 + \frac{\max2 - \min2}{Max2 - Min2}\left\{F2\left(\frac{ave2 - \min2}{\max2 - \min2}(Max2 - Min2) + Min2\right) - Min2\right\};$$

second writing circuitry for writing the value of the second pseudo-pixel into the image memory; and image-forming circuitry for forming the second image by adding the first and second pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

19. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four neighboring pixels by averaging out the four pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = \text{min1} + \frac{\text{max1} - \text{min1}}{\text{Max1} - \text{Min1}} \left\{ F1 \left( \frac{\text{ave1} - \text{min1}}{\text{max1} - \text{min1}} (\text{Max1} - \text{Min1}) + \text{Min1} \right) - \text{Min1} \right\};$$

first writing circuitry for writing the value of the first pseudo-pixel into the image memory;

average determining means for computing the average of the two neighboring pixels and two of the first pseudo-pixels, to store the computed average value in the image memory as the value of the second pseudo-pixel; and image forming circuitry for forming the second image by adding the five pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

20. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four neighboring pixels by averaging out two of the four pixels excluding the maximum value and the minimum value pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = \text{min1} + \frac{\text{max1} - \text{min1}}{\text{Max1} - \text{Min1}} \left\{ F1 \left( \frac{\text{ave1} - \text{min1}}{\text{max1} - \text{min1}} (\text{Max1} - \text{Min1}) + \text{Min1} \right) - \text{Min1} \right\};$$

first writing circuitry for writing the value of the first pseudo-pixel into the image memory;

average determining means for computing the average of the values of the four neighboring pixels to store the computed average value in the image memory as the value of the second pseudo-pixel; and image forming circuitry for forming the second image by adding the five pseudo-pixels to the first image, the first image being enlarged both lengthwise and breadthwise by a factor of two, wherein first pseudo-pixels are interpolated diagonally and second pseudo-pixels are interpolated vertically and horizontally in a resulting enlarged first image to form the second image.

21. An apparatus for interpolating pseudo-pixels in order to form a second image, which is an expanded version of a first image having at least four pixels, by interpolating a plurality of pixels constituting the first image with a plurality of first pseudo-pixels which neighbor to the pixels diagonally and with a plurality of second pseudo-pixels which neighbor to the original pixels vertically and horizontally, the apparatus comprising:

an image memory for storing data of the first image and the second image;

a first computer unit for computing a first average value, a maximum value, and a minimum value of the four pixels diagonally neighboring to a first pseudo-pixel, and for computing the first average value of the four neighboring pixels by averaging out two of the four pixels excluding the maximum value and the minimum value pixels, each being referred to as max1, min1 and ave1;

first mapping circuitry for computing a mapping value for ave1 to be stored in the image memory as the value of the first pseudo-pixel by using a first function F1 which is a monotonous increasing non-linear function ranging from Min1 to Max1, whose minimum value and maximum value in the range and those of the domain of definition are consistent with the Min1 and the Max1, and given by $$D1 = \text{min1} + \frac{\text{max1} - \text{min1}}{\text{Max1} - \text{Min1}} \left\{ F1 \left( \frac{\text{ave1} - \text{min1}}{\text{max1} - \text{min1}} (\text{Max1} - \text{Min1}) + \text{Min1} \right) - \text{Min1} \right\};$$

first writing circuitry for writing the value of the first pseudo-pixel into the image memory;

average determining means for computing the average of the two neighboring pixels and two of the first pseudo-pixels, to store the computed average value in the image memory as the value of the second pseudo-pixel; and image forming circuitry for forming the second image by adding the five pseudo-pixels to the first image, the first image being enlarged both lengthwise and breadthwise by a factor of two wherein first pseudo-pixels are interpolated diagonally and second pseudo-pixels are interpolated vertically and horizontally in a resulting enlarged first image to form the second image.

* * * * *